United States Patent
Tanaka et al.

(10) Patent No.: US 8,339,924 B2
(45) Date of Patent: Dec. 25, 2012

(54) OPTICAL PICKUP DEVICE CAPABLE OF EMITTING FIRST AND SECOND LIGHT BEAMS HAVING DIFFERENT WAVELENGTHS AND INCLUDING A LIGHT BLOCKING MEMBER FOR BLOCKING LIGHT OF A SPECIFIC WAVELENGTH, AND A OPTICAL INFORMATION DEVICE, COMPUTER, OPTICAL DISK PLAYER, CAR NAVIGATION SYSTEM, OPTICAL DISK RECORDER, AND OPTICAL DISK SERVER PERFORMING THE SAME

(75) Inventors: Toshiyasu Tanaka, Osaka (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 12/377,945

(22) PCT Filed: Oct. 4, 2007

(86) PCT No.: PCT/JP2007/069486
§ 371 (c)(1),
(2), (4) Date: Feb. 18, 2009

(87) PCT Pub. No.: WO2008/044601
PCT Pub. Date: Apr. 17, 2008

(65) Prior Publication Data
US 2010/0246347 A1  Sep. 30, 2010

(30) Foreign Application Priority Data

Oct. 10, 2006  (JP) ................................. 2006-276216

(51) Int. Cl.
*G11B 7/135* (2012.01)
(52) U.S. Cl. .......... 369/112.22; 369/112.28; 369/112.29
(58) Field of Classification Search ............. 369/112.22; G11B 7/16
See application file for complete search history.

(56) References Cited

U.S. PATENT DOCUMENTS 5,729,521 A * 3/1998 Otsuka ..................... 369/112.29
(Continued)

FOREIGN PATENT DOCUMENTS

JP  2002-208173  7/2002
(Continued)

OTHER PUBLICATIONS

English Machine Translation of JP 2002-208173, Sago et al., "Optical Head", published on Jul. 26, 2002.*

(Continued)

*Primary Examiner* — Hoa T Nguyen
*Assistant Examiner* — Mark Fischer
(74) *Attorney, Agent, or Firm* — Wenderoth, Lind & Ponack, L.L.P.

(57) ABSTRACT

An optical pickup device preventing damage or performance degradation of a second optical system. The optical pickup device includes first laser light source emitting a first light beam having a first wavelength, a first optical system guiding the first light beam emitted from the first laser light source to a first optical disc. Further, the optical pickup device includes a DVD integration unit emitting a second light beam having a second wavelength different from the first wavelength, a second optical system guiding the second light beam emitted from the DVD integration unit to a second optical disc different from the first optical disc, and a filter disposed at a position blocking incident light, of an unwanted light beam having the first wavelength and derived from the first optical system, from entering into the second optical system, so as to block the first light beam having the first wavelength.

10 Claims, 21 Drawing Sheets

U.S. PATENT DOCUMENTS

| | | | |
|---|---|---|---|
| 6,069,860 A * | 5/2000 | Mizuno et al. | 369/112.26 |
| 2001/0017490 A1* | 8/2001 | Suzuki et al. | 310/12 |
| 2004/0103421 A1* | 5/2004 | Nakata et al. | 720/689 |
| 2004/0156302 A1* | 8/2004 | Nakata et al. | 369/112.17 |
| 2004/0170106 A1* | 9/2004 | Komma | 369/112.1 |
| 2006/0002247 A1 | 1/2006 | Kim et al. | |
| 2006/0028935 A1 | 2/2006 | Mori et al. | |
| 2006/0077793 A1* | 4/2006 | Kimura et al. | 369/44.23 |
| 2006/0164954 A1 | 7/2006 | Hashimura | |

FOREIGN PATENT DOCUMENTS

| | | |
|---|---|---|
| JP | 2003-296958 | 10/2003 |
| JP | 2005-141016 | 6/2005 |
| JP | 2005-293686 | 10/2005 |
| JP | 2005-306896 | 11/2005 |
| JP | 2006-24351 | 1/2006 |
| JP | 2006-120284 | 5/2006 |
| JP | 2006-202416 | 8/2006 |

OTHER PUBLICATIONS

International Search Report issued Nov. 6, 2007 in the International (PCT) Application No. PCT/JP2007/069486.

* cited by examiner

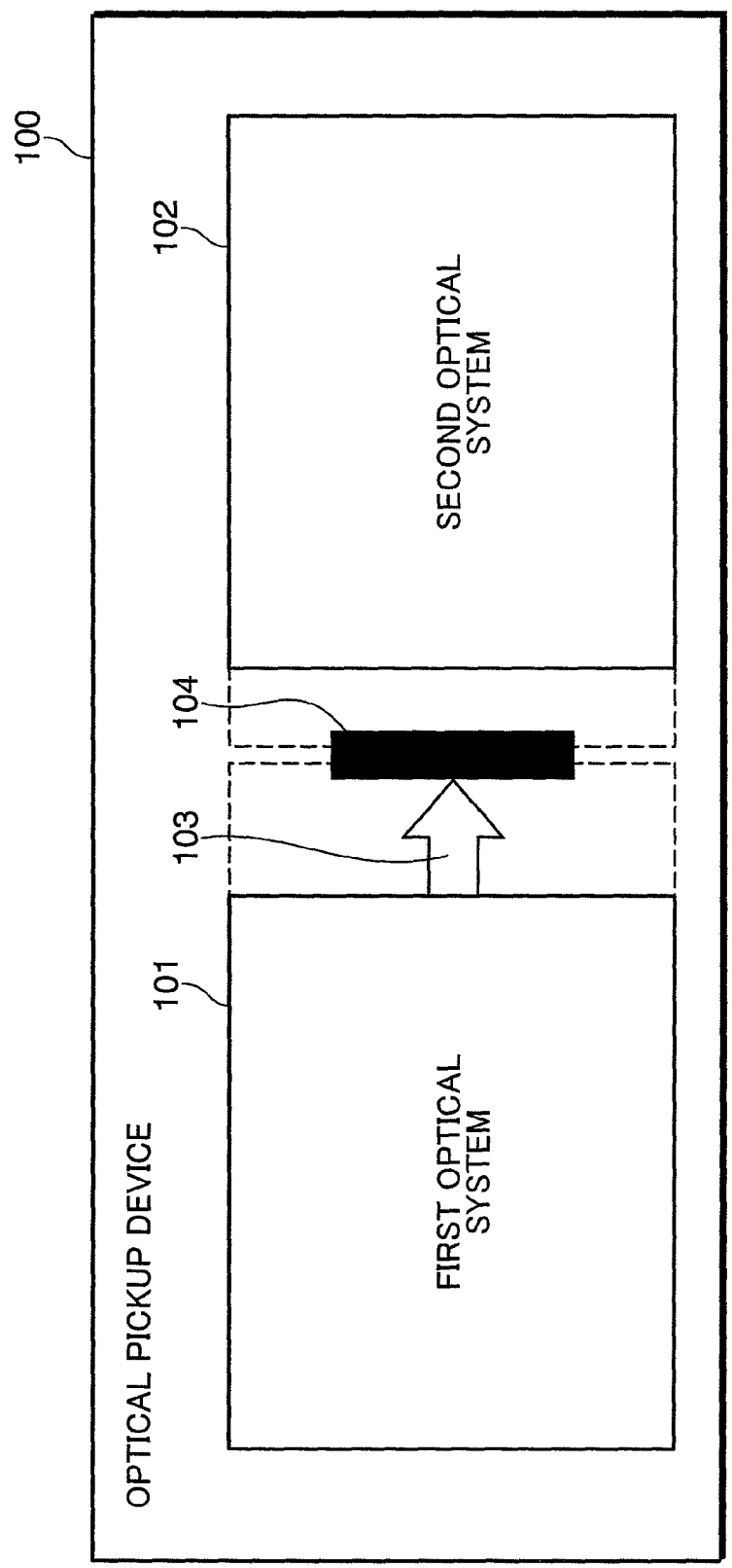

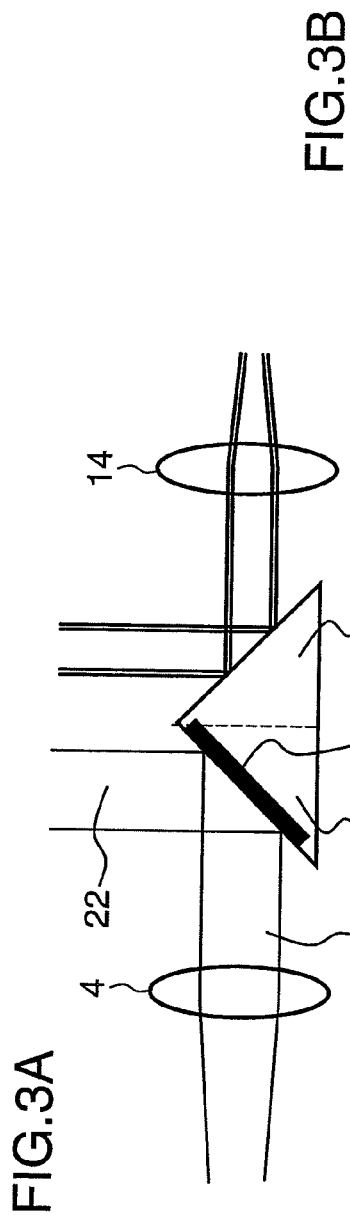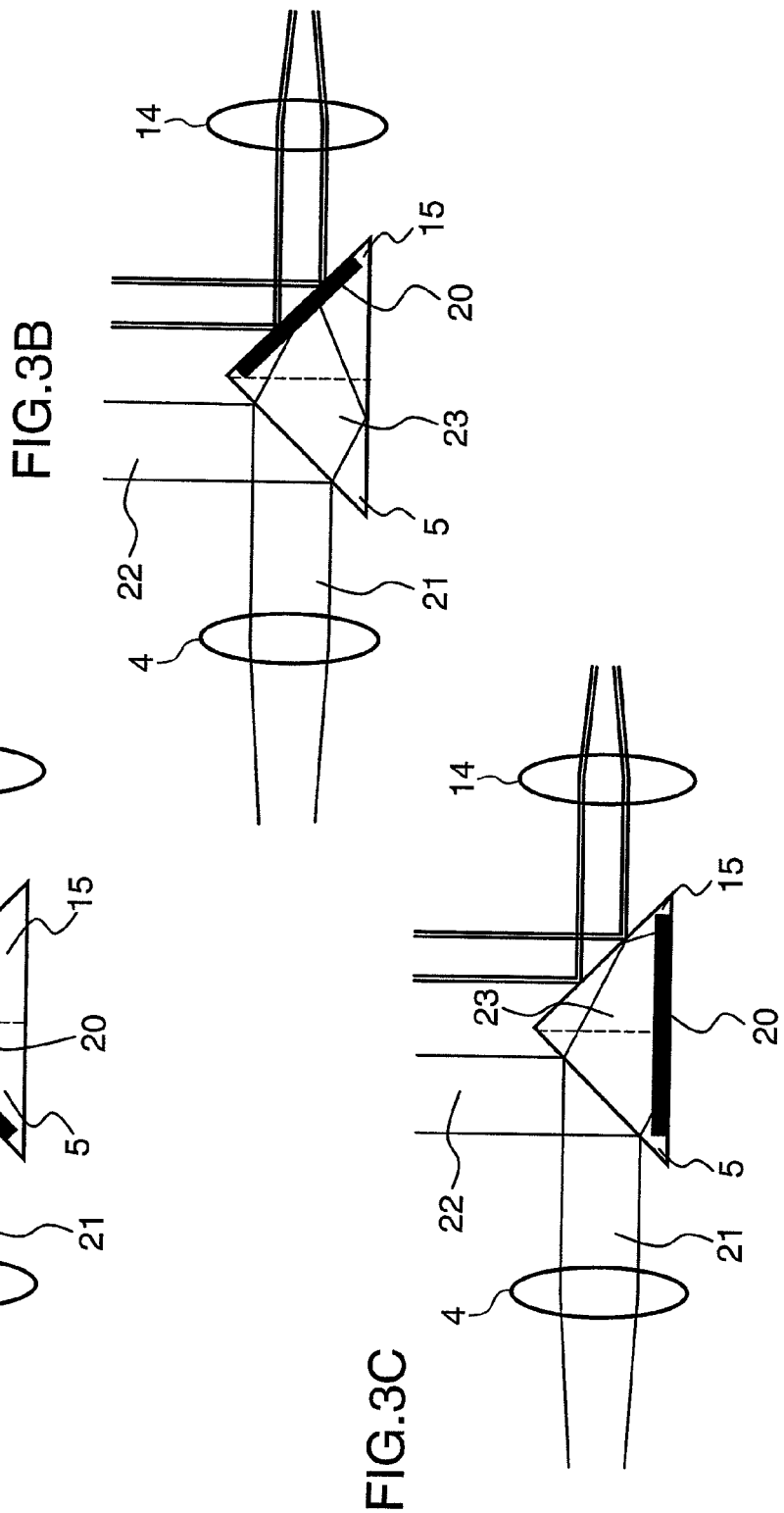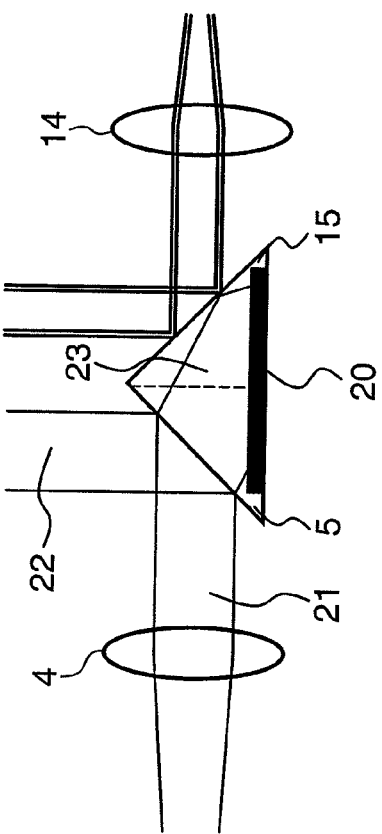

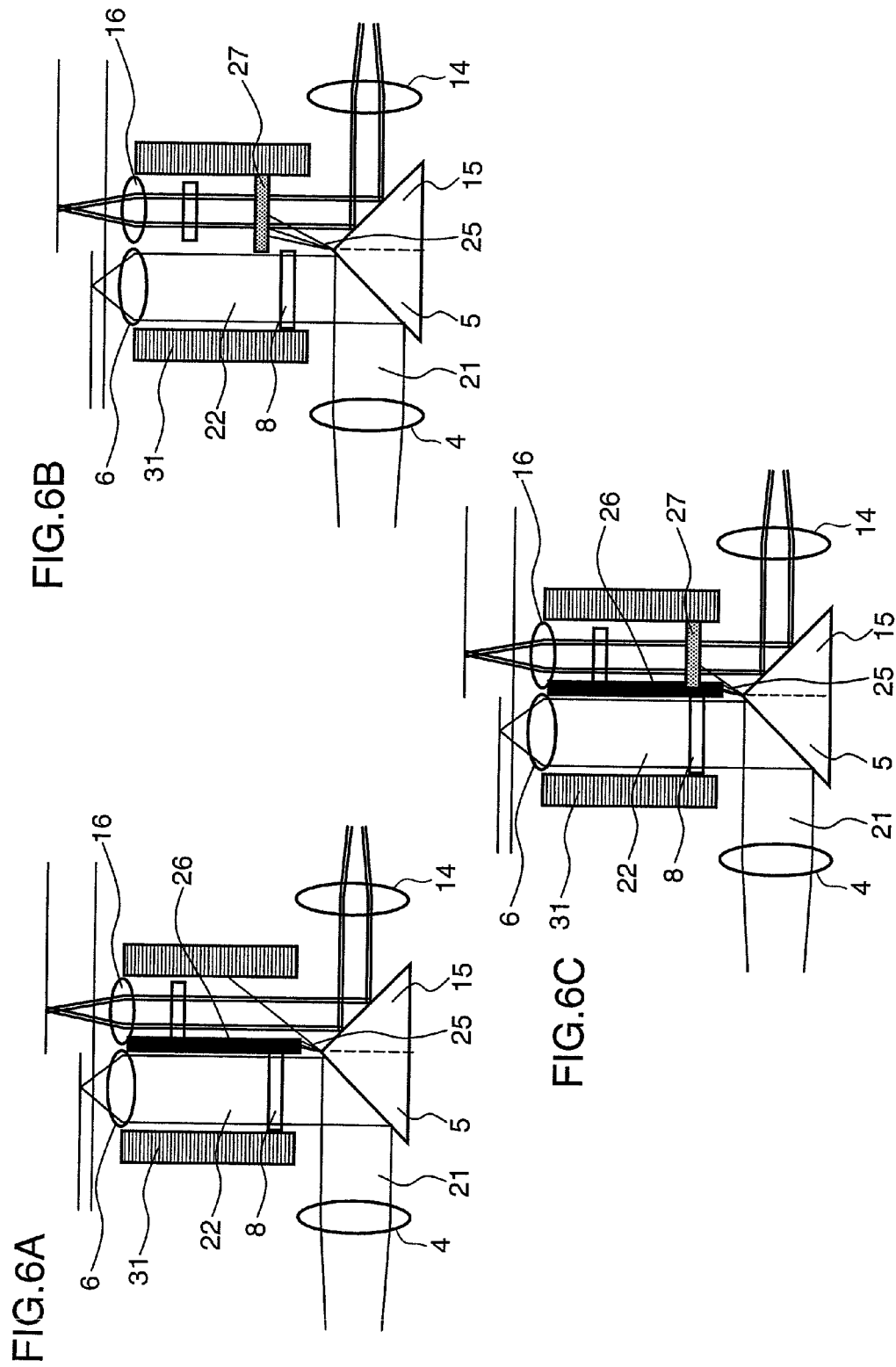

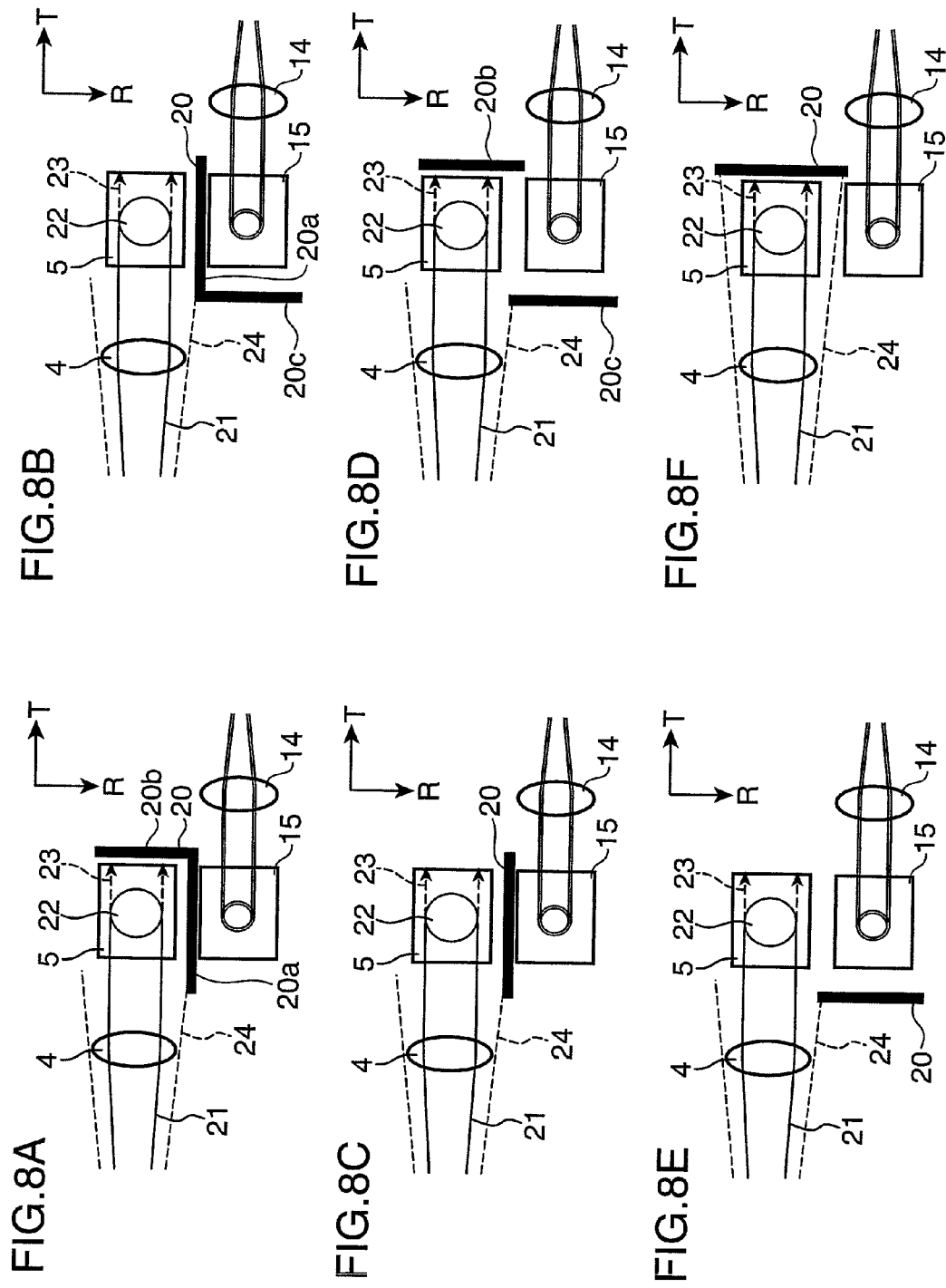

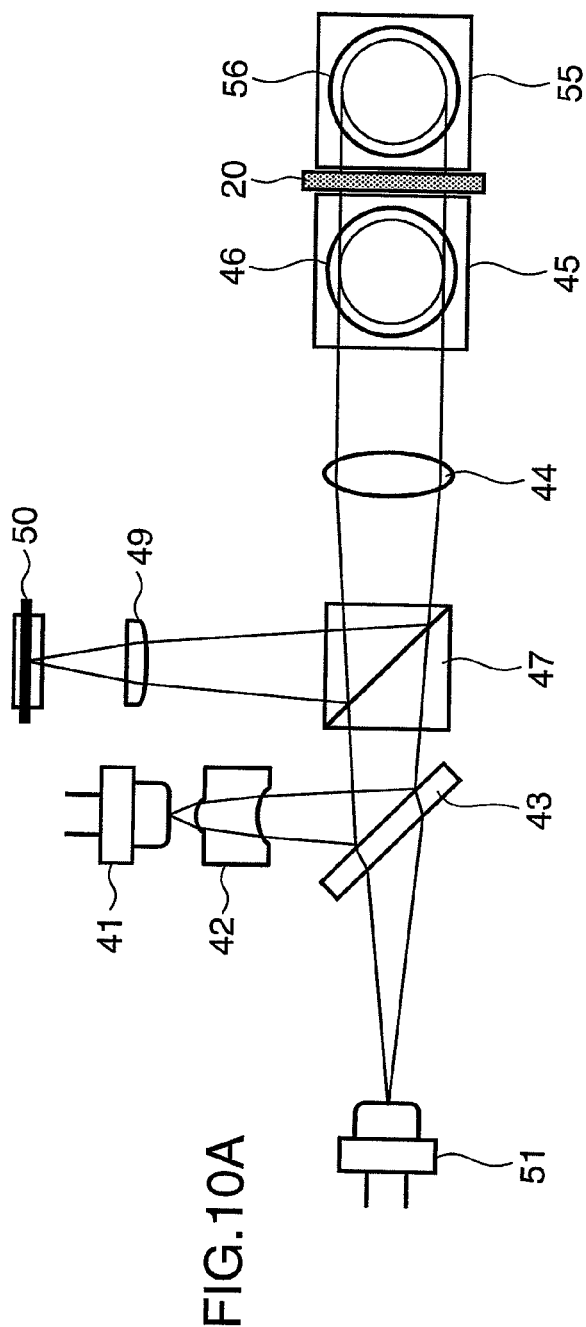
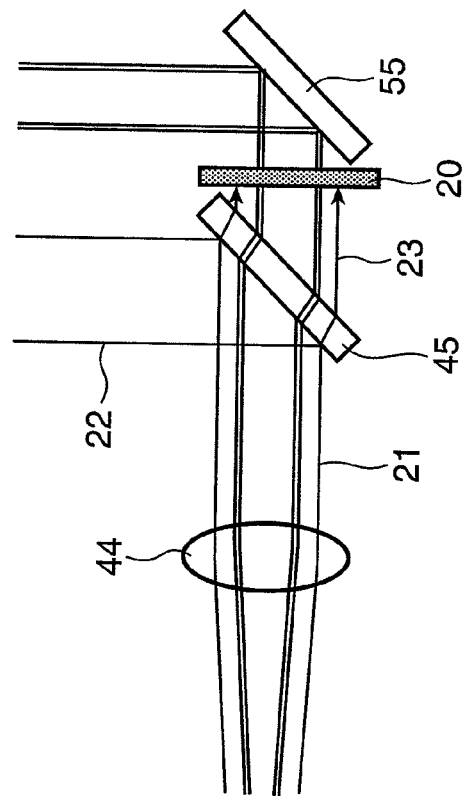
FIG.10A
FIG.10B

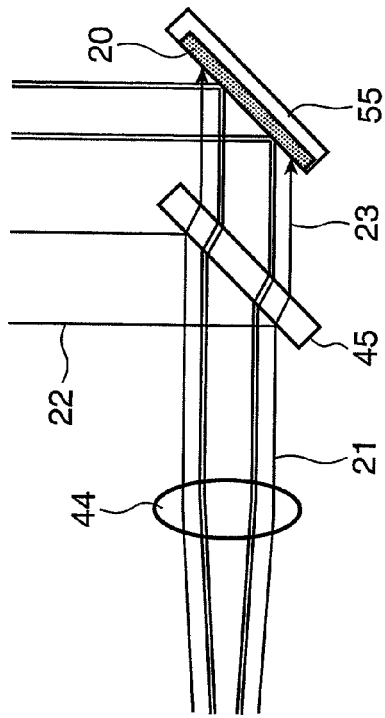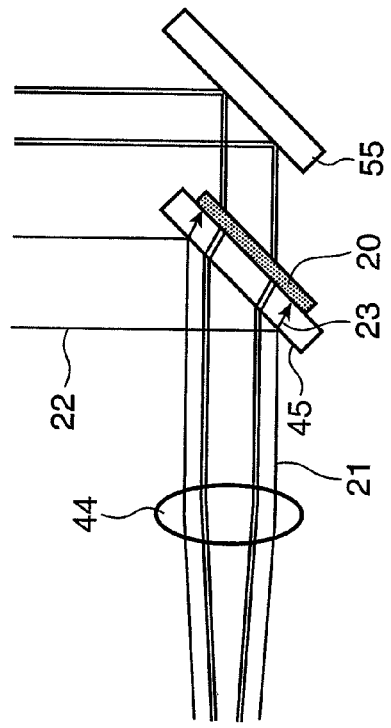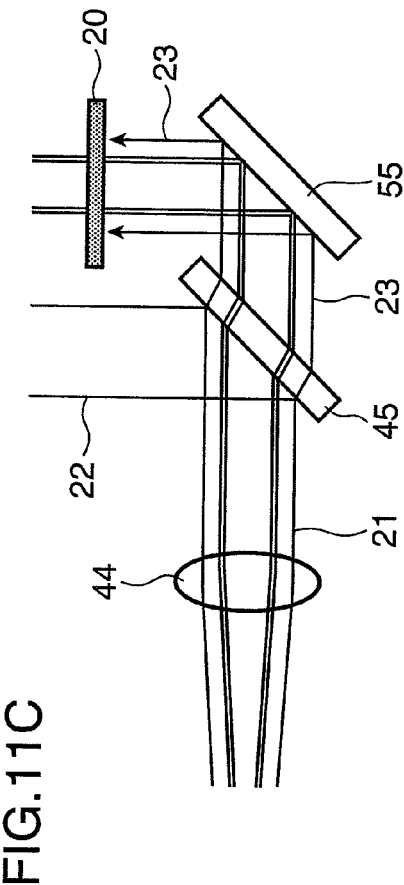

OPTICAL PICKUP DEVICE CAPABLE OF EMITTING FIRST AND SECOND LIGHT BEAMS HAVING DIFFERENT WAVELENGTHS AND INCLUDING A LIGHT BLOCKING MEMBER FOR BLOCKING LIGHT OF A SPECIFIC WAVELENGTH, AND A OPTICAL INFORMATION DEVICE, COMPUTER, OPTICAL DISK PLAYER, CAR NAVIGATION SYSTEM, OPTICAL DISK RECORDER, AND OPTICAL DISK SERVER PERFORMING THE SAME

TECHNICAL FIELD

The present invention relates to an optical pickup device, an optical information device, a computer, an optical disc player, a car navigation system, an optical disc recorder, and an optical disc server for recording information in an optical disc and/or reproducing information from an optical disc.

BACKGROUND ART

There are proposed a variety of kinds of recording media for recording or storing digital audio data, an image, a moving image, and a document file/data file created with use of a computer or a like device. An optical disc is known among the variety of kinds of recording media. A DVD (Digital Versatile Disk) has a high density and a large capacity, as compared with a conventional CD (Compact Disc), and has been spread as a recording medium for use in a recording device in place of a VTR (Video Tape Recorder). In recent years, development of a next-generation optical disc having a higher recording density, with use of a blue semiconductor laser, has been progressed in many research institutes, and rapid spread of the next-generation optical disc has been awaited.

It is necessary to increase the recording density of information by reducing the size of light spot to be defined by irradiation of light onto an optical disc in recording information in the optical disc and reproducing information recorded in the optical disc in order to increase the capacity of the optical disc. The size of light spot can be reduced by using a light source for emitting laser light of a short wavelength, and increasing the numerical aperture (NA) of an objective lens. In DVD, a light source having a wavelength of 660 nm, and an objective lens having a numerical aperture (NA) of 0.6 are used. For instance, use of a blue laser having a wavelength of 405 nm, and an objective lens having NA of 0.85 enables to obtain a recording density five times of the recording density of a currently available DVD. An optical information device is necessary to perform a data recording/reproducing operation with respect to the optical disc having the above specifications.

Providing compatibility with an existing optical disc in an optical information device for performing a high-density recording/reproducing operation with use of laser light of a short wavelength to be emitted from a blue laser is advantageous in enhancing the utility of the device, and increasing the cost performance of the device. In providing compatibility, it is difficult to secure a long operating distance, as in an objective lens for use in DVD or CD, while securing a large numerical aperture i.e. 0.85 for the objective lens. In view of this, in the compatible optical information device capable of performing a high-density recording/reproducing operation, it is desirable to individually provide at least one objective lens for use in recording and reproducing information on and from CD or DVD, and a high-density recording objective lens having a numerical aperture larger than the numerical aperture of the one objective lens.

An optical pickup device of a first conventional art has multiple objective lenses in a movable section to realize a compatible optical information device capable of recording and reproducing on and from multiple optical discs different from each other in recording density (see e.g. patent document 1). FIG. 19 is a diagram showing an arrangement of the optical pickup device of the first conventional art.

A first light beam emitted from a first light source 61 is converted into substantially parallel light by a collimator lens 62. Then, an optical axis of the first light beam is bent by a half mirror 63, and is further bent by a rise-up mirror 64 in a direction orthogonal to a first optical disc (not shown) having a high recording density. A first objective lens 65 is operable to converge the first light beam on a recording surface of the first optical disc. Similarly to the first light beam, a second light beam emitted from a second light source 71 is converted into substantially parallel light by a collimator lens 72. Then, an optical axis of the second light beam is bent by a beam splitter 73, and is further bent by the rise-up mirror 64 in a direction orthogonal to a second optical disc (not shown) having a recording density lower than the recording density of the first optical disc. A second objective lens 75 is operable to converge the second light beam on a recording surface of the second optical disc.

As described above, the optical pickup device of the first conventional art includes: at least two objective lenses i.e. the first objective lens 65 for condensing the first light beam to be emitted from the first light source 61 on the information recording surface of the first optical disc, and the second objective lens 75 for condensing the second light beam to be emitted from the second light source 71 on the information recording surface of the second optical disc; and the rise-up mirror having at least two reflection surfaces i.e. a reflection surface for reflecting the first light beam for incidence into the first objective lens 65, and a reflection surface for reflecting the second light beam for incidence into the second objective lens 75. This arrangement enables to realize a compatible optical pickup device capable of recording and reproducing on and from multiple optical discs different from each other in recording density.

An optical pickup device incorporated with a blue semiconductor laser of a second conventional art includes an optical component made of a resin, or an optical element formed by cementing light transmissive members to each other by a UV curable adhesive or a like agent. In use of the optical pickup device having the above arrangement, irradiation of blue laser light may lower the transmittance of the optical component, or affect the composition of the light transmissive member, thereby damaging the optical element. In view of this, various measures have been proposed to enhance the light resistance of the light transmissive member against blue laser light (see e.g. patent documents 2 and 3).

An optical pickup device of a third conventional art has light blocking means for blocking laser light (see e.g. patent document 4). FIGS. 20A and 20B are diagrams showing an arrangement of the optical pickup device of the third conventional art. Referring to FIGS. 20A and 20B, a light blocking plate 80 is provided to prevent stray light in a first optical unit 81 and a second optical unit 82 from being incident into the counterpart unit as noise to thereby prevent mutual interference of laser light.

In the first conventional art, multiple light sources are provided in a single optical pickup device to realize a compatible optical pickup device capable of recording and reproducing on and from multiple optical discs different from each other in recording density. In the case where a blue semiconductor laser is used as one of the light sources, it is necessary to use an optical element having high light resistance against blue light, as recited in the second conventional art, as all the optical elements through which a light beam to be emitted from the blue semiconductor laser is supposed to be transmitted. The optical pickup device of the first conventional art has an optical arrangement that an optical system having a blue semiconductor laser as a light source, and an optical system having a semiconductor laser for emitting light in a red wavelength band and an infrared wavelength band as a light source, are disposed opposite to the rise-up mirror 64 having at least two reflection surfaces so that the individual light fluxes are incident into the rise-up mirror 64.

FIGS. 21A and 21B are side views of a rise-up mirror of a conventional optical pickup device. In this arrangement, as shown in e.g. FIG. 21A, a blue light beam (i.e. leaked light 67) which has been partially transmitted through a reflection surface 64a of the rise-up mirror 64 is transmitted through the other reflection surface 64b after having been reflected on an inner surface of the rise-up mirror 64 or a like operation. Thereafter, the blue light beam is incident into an optical system for guiding red/infrared light. Further, as shown in e.g. FIG. 21B, upon irradiation of a blue light beam in the vicinity of a vertex 64t of the rise-up mirror 64, the blue light beam is scattered, and scattered light 68 is incident into the objective lens 75 for guiding red/infrared light.

Because of the above phenomenon, use of a resin component, as an optical component for a semiconductor laser for emitting laser light in a red wavelength band or an infrared wavelength band, may cause damage of an optical element, transmittance lowering, or wavefront aberration degradation, with the result that the recording/reproducing performance of the optical pickup device may be degraded, because generally the optical element does not have light resistance against blue light. It is possible to reduce the light amount of a blue light beam passing through the optical component for guiding red/infrared light by limiting the emission light amount of the blue light beam in order to suppress damage or performance degradation of the optical element. However, if the above measure is taken, it may be difficult or impossible to secure a light amount of a blue light beam sufficient for performing a recording/reproducing operation with respect to a multi-layered disc, or a high-speed recording/reproducing operation. This may lower the recording/reproducing quality of the optical pickup device.

The third conventional art discloses an arrangement, considering noise which may be generated by mutual interference of laser light. The light blocking plate 80 is provided solely between two rise-up mirrors, and the height of the light blocking plate 80 is not larger than the height of the rise-up mirrors. Stray light may be generated in the optical pickup device in a region other than the region between the rise-up mirrors. For instance, there is a likelihood that scattered light from one side of the rise-up mirror may be incident into a component on an optical path defined by bending the optical axis of laser light in a direction substantially perpendicular to a bottom surface of the optical pickup device by the rise-up mirror, as stray light from the counterpart optical system (optical unit).

The light blocking plate 80 in the third conventional art is not a light blocking plate for blocking light of a specific wavelength. The third conventional art does not consider a case that light of a short wavelength e.g. blue violet light, other than the wavelength of red light or infrared light, may be incident. In the arrangement, wherein the light blocking plate 80 may allow transmitting of light of a short wavelength e.g. blue violet light, there is a likelihood that one of the optical components on the optical path may be exposed to blue violet light, thereby causing wavefront aberration degradation or transmittance lowering.

Patent document 1: JP 2005-293686A
Patent document 2: JP 2005-141016A
Patent document 3: JP 2005-306896A
Patent document 4: JP 2002-208173A

DISCLOSURE OF THE INVENTION

In view of the above, it is an object of the invention to provide an optical pickup device, an optical information device, a computer, an optical disc player, a car navigation system, an optical disc recorder, and an optical disc server that enable to prevent damage or performance degradation of an optical component constituting a second optical system, and suppress degradation of the recording/reproducing performance of the optical pickup device.

An optical pickup device according to an aspect of the invention includes: a first light source for emitting a first light beam having a first wavelength; a first optical system for guiding the first light beam to be emitted from the first light source to a first optical disc; a second light source for emitting a second light beam having a second wavelength different from the first wavelength; a second optical system for guiding the second light beam to be emitted from the second light source to a second optical disc different from the first optical disc in recording density; and a light blocking member, disposed at a position capable of blocking incidence of an unwanted light beam having the first wavelength derived from the first optical system into an optical component constituting the second optical system, for blocking the first light beam having the first wavelength.

In the above arrangement, there is no likelihood that the first light beam having the first wavelength may be incident into the optical component constituting the second optical system. This enables to prevent damage or performance degradation of the optical component constituting the second optical system, and suppress degradation of the recording/reproducing performance of the optical pickup device.

These and other objects, features and advantages of the present invention will become more apparent upon reading of the following detailed description along with the accompanying drawings.

BRIEF DESCRIPTION OF THE DRAWINGS

FIG. 1 is a conceptual diagram of an optical pickup device embodying the invention.

FIGS. 3A through 3C are enlarged side views of rise-up mirrors in optical pickup devices in accordance with a second embodiment of the invention.

FIGS. 6A through 6C are enlarged side views of rise-up mirrors in optical pickup devices in accordance with a fourth embodiment of the invention.

FIGS. 8A through 8F are enlarged top plan views of rise-up mirrors in optical pickup devices as a first modification of the fifth embodiment.

FIGS. 10A and 10B are diagrams showing an arrangement of an optical pickup device in accordance with a sixth embodiment of the invention.

FIGS. 11A through 11C are enlarged side views of rise-up mirrors in optical pickup devices as first through third modifications of the sixth embodiment.

BEST MODE FOR CARRYING OUT THE INVENTION

In the following, embodiments of the invention are described referring to the accompanying drawings. The embodiments are merely examples embodying the invention, and do not limit the technical scope of the invention.

FIG. 1 is a conceptual diagram of an optical pickup device embodying the invention. An optical pickup device 100 embodying the invention includes a first optical system 101 for guiding light of at least a wavelength $\lambda 1$ (e.g. 420 nm or less) to an optical disc, a second optical system 102 for guiding light of at least a wavelength $\lambda 2$ to an optical disc, and a filter 104 for blocking light of the wavelength $\lambda 1$. The filter 104 is disposed at a position exterior to the first optical system 101, the second optical system 102, or any optical system of the optical pickup device 100. The filter 104 is adapted to prevent incidence of light displaced from a primary optical path of a light flux of the wavelength $\lambda 1$, which is transmitted through the first optical system 101 for recording or reproducing information in or from an optical disc, in other words, leaked light, unwanted light, or scattered light of the wavelength $\lambda 1$, into the second optical system 102, where there is no need of transmitting the light flux of the wavelength $\lambda 1$.

First Embodiment

Figure 2A:
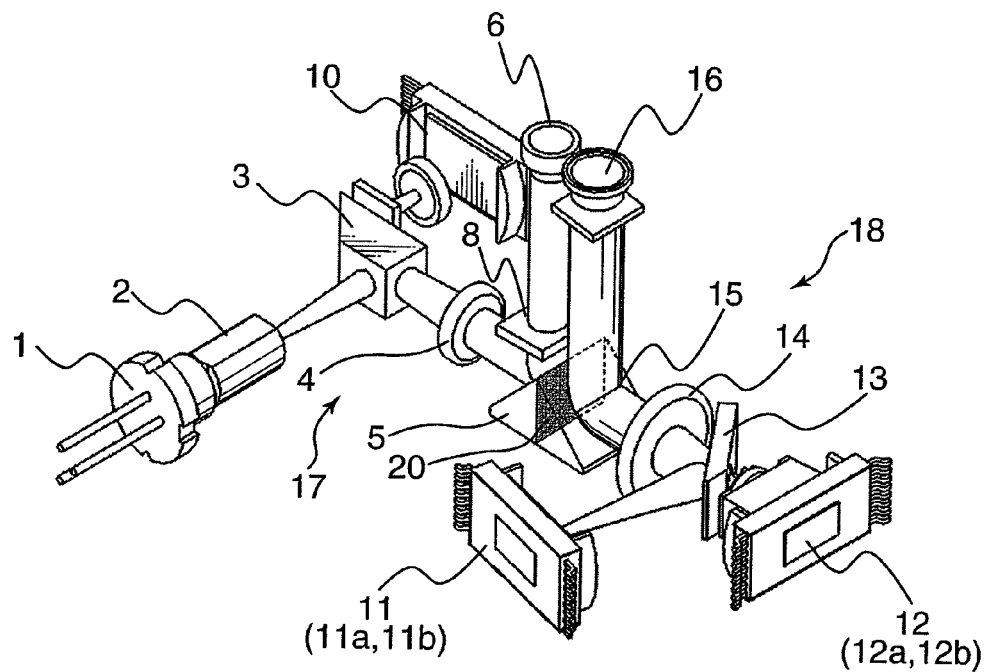
FIGS. 2A and 2B are diagrams showing an example of an optical pickup device in accordance with a first embodiment of the invention.

FIG. 2A is a diagram showing an example of an optical pickup device in accordance with the first embodiment.

Referring to FIG. 2A, the optical pickup device includes a first laser light source 1, a beam shape forming element 2, a beam splitter 3, a collimator lens 4, a first rise-up mirror 5, a first objective lens 6, a quarter wavelength plate 8, a first photodetector 10, a DVD integration unit 11, a CD integration unit 12, a wavelength, selective mirror 13, a collimator lens 14, a second rise-up mirror 15, a second objective lens 16, and a filter 20.

A first optical system 17 is constituted of the beam shape forming element 2, the beam splitter 3, the collimator lens 4, the first rise-up mirror 5, the first objective lens 6, and the quarter wavelength plate 8. A second optical system 18 is constituted of the wavelength selective mirror 13, the collimator lens 14, the second rise-up mirror 15, and the second objective lens 16.

The first laser light source 1 emits first laser light of a first wavelength $\lambda 1$ (390 nm to 420 nm, in this embodiment, 405 nm is used as an example). The beam shape forming element 2 shapes the form of a far-field image of the first laser light. The beam splitter 3 separates an optical path. The collimator lens 4 converts the first laser light from diverging light into parallel light. The first rise-up mirror 5 bends an optical axis of the first laser light toward an optical disc (e.g. Blu-ray disc). The first objective lens (optical lens) 6 condenses the first laser light on the optical disc. The quarter wavelength plate 8 converts linearly polarized light into circularly polarized light. The first photodetector 10 receives light reflected on the optical disc, and converts the received light into an electrical signal corresponding to the light amount of the received light.

The first laser light source 1 is preferably a semiconductor laser light source. With use of the semiconductor laser light source, an optical pickup device, and an optical information device incorporated with the optical pickup device can be miniaturized and light-weighted with a reduced power consumption.

In the case where a recording or reproducing operation is performed with respect to an optical disc, a blue light beam of the first wavelength $\lambda 1$ to be emitted from the first laser light source 1 has its shape formed by the beam shape forming element 2, is reflected by the beam splitter 3, and is converted into substantially parallel light by the collimator lens 4. The blue light beam, as substantially parallel light, has its optical axis bent substantially at a right angle by the first rise-up mirror 5. Then, the blue light beam is converted from linearly polarized light into circularly polarized light by the quarter wavelength plate 8. The blue light beam, as circularly polarized light, is condensed on the information recording surface of the optical disc through a substrate of 0.1 mm in thickness by the refractive first objective lens 6.

The blue light beam reflected on the information recording surface of the optical disc is propagated backward along the optical path; is converted into linearly polarized light in a direction displaced by a right angle with respect to the original optical path by the quarter wavelength plate 8; has its optical axis bent substantially at a right angle by the first rise-up mirror 5; and the focal length thereof is extended by the collimator lens 4. The blue light beam whose focal length has been extended is reflected on the beam splitter 3, while being transmitted therethrough, and is incident into the first photodetector 10. Then, the output of the first photodetector 10 is calculated to thereby obtain a servo signal to be used in focus control or tracking control and an information signal. As described above, the beam splitter 3 is an optical path splitting element provided with a polarization separation film allowing total reflection of linearly polarized light in one direction of a light beam having the first wavelength $\lambda 1$, and total transmittance of linearly polarized light in a direction displaced by a right angle with respect to the linearly polarized light in the one direction.

Referring to FIG. 2A, the DVD integration unit 11 includes a second laser light source 11a and a second photodetector 11b. The second laser light source 11a emits second laser light of a second wavelength $\lambda 2$ (640 to 670 nm, in this embodiment, 650 nm is used as an example). The second photodetector 11b receives light reflected on an optical disc (DVD), and converts the received light into an electrical signal corresponding to the light amount of the received light.

The CD integration unit 12 includes a third laser light source 12a and a third photodetector 12b. The third laser light source 12a emits third laser light of a third wavelength $\lambda 3$ (770 to 800 nm, in this embodiment, 790 nm is used as an example). The third photodetector 12b receives light reflected on an optical disc (CD) to convert the received light into an electrical signal corresponding to the light amount of the received light.

The wavelength selective mirror 13 reflects a light beam of the second wavelength $\lambda 2$, and transmits a light beam of the third wavelength $\lambda 3$. The collimator lens 14 converts the second laser light and the third laser light from diverging light into parallel light. The second rise-up mirror 15 bends the optical axes of the second laser light and the third laser light toward the optical disc.

The second objective lens 16 is compatible with both of DVD and CD, and condenses the second laser light and the third laser light on the respective corresponding optical discs. The second laser light of the second wavelength $\lambda 2$ is irradiated on an optical disc having a substrate thickness t2 of 0.6 mm and to be recorded or reproduced by a light beam of the second wavelength $\lambda 2$. The third laser light of the third wavelength $\lambda 3$ is irradiated on an optical disc having a substrate thickness t3 of 1.2 mm and to be recorded or reproduced by a light beam of the third wavelength $\lambda 3$.

In the case where a recording or reproducing operation is performed with respect to an optical disc (DVD), a red light beam of the second wavelength $\lambda 2$ to be emitted from the second laser light source 11a is reflected on the wavelength selective mirror 13, and is converted into substantially parallel light by the collimator lens 4. The red light beam, as substantially parallel light, has its optical axis bent substantially at a right angle by the second rise-up mirror 15, and is condensed on the information recording surface of the DVD through a substrate of 0.6 mm in thickness by the second objective lens 16.

The red light beam reflected on the information recording surface of the DVD is propagated backward along the optical path, has its optical axis bent substantially at a right angle by the second rise-up mirror 15, and the focal length thereof is extended by the collimator lens 14. The red light beam whose focal length has been extended is reflected on the wavelength selective mirror 13, and is incident into the second photodetector 11b. Then, the output of the second photodetector 11b is calculated to obtain a servo signal to be used in focus control or tracking control and an information signal.

In the case where a recording or reproducing operation is performed with respect to an optical disc (CD), an infrared light beam of the third wavelength $\lambda 3$ to be emitted from the third laser light source 12a is transmitted through the wavelength selective mirror 13, and is converted into substantially parallel light by the collimator lens 4. The infrared light beam, as substantially parallel light, has its optical axis bent substantially at a right angle by the second rise-up mirror 15. Then, the infrared light beam is condensed on the information recording surface of the CD through a substrate of 1.2 mm in thickness by the second objective lens 16.

The infrared light beam reflected on the information recording surface of the CD is propagated backward along the optical path, has its optical axis bent substantially at a right angle by the second rise-up mirror 15, and the focal length thereof is extended by the collimator lens 14. The infrared light beam whose focal length has been extended is transmitted through the wavelength selective mirror 13, and is incident into the third photodetector 12b. Then, the output of the third photodetector 12b is calculated to obtain a servo signal to be used in focus control or tracking control and an information signal.

The optical axis of the first light beam to be incident from the first laser light source 1 into the first rise-up mirror 5 is aligned substantially parallel with the optical axis of the second light beam to be incident from the second laser light 11a into the second rise-up mirror 15, or the optical axis of the third light beam to be incident from the third laser light source 12a into the second rise-up mirror 15. The first laser light source 1, and the second laser light source 11 or the third laser light source 12 are disposed at positions opposite to each other. The first rise-up mirror 5 and the second rise-up mirror 15 are disposed side by side in a direction perpendicular to a radial direction of the optical disc. The first rise-up mirror 5 and the second rise-up mirror 15 are disposed on an optical base block for supporting an optical component.

Figure 2B:
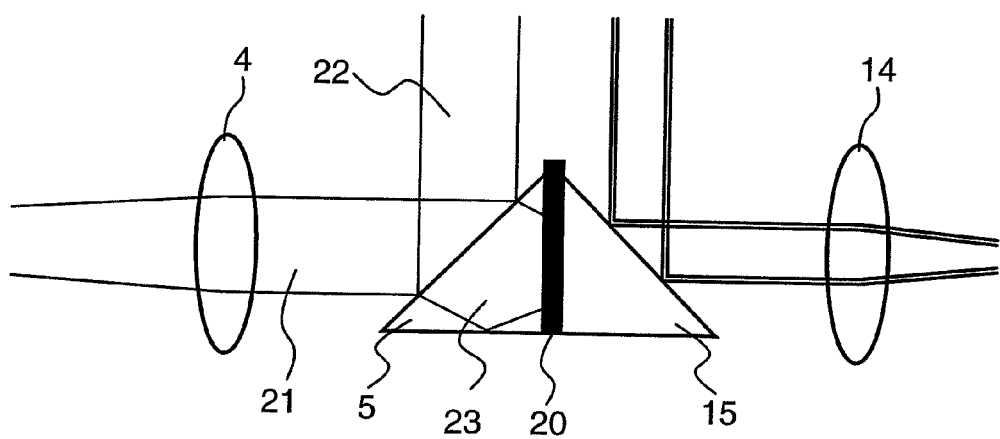

FIG. 2B is an enlarged side view of the rise-up mirrors shown in FIG. 2A. The filter 20 is disposed between the first rise-up mirror 5 and the second rise-up mirror 15 to absorb blue light. A blue light beam 21 to be incident from the first rise-up mirror 5 is separated into a first component 22 whose optical path is bent on a reflection surface of the first rise-up mirror 5, and a second component (leaked light) 23 which is incident into the interior of the first rise-up mirror 5 without being bent by the reflection surface of the first rise-up mirror 5.

The first component 22 is an important component to be irradiated onto the optical disc, but the second component 23 is an unwanted component which does not contribute to a signal of the optical disc. In this arrangement, preferably, the filter 20 is operable to absorb the second component (leaked light) 23, and has a transmittance of 5% or less with respect to light of the first wavelength $\lambda 1$. With use of the filter having the above characteristics, there is no or less likelihood that the leaked light 23 may be incident into the interior of an optical system, where optical components for the second wavelength $\lambda 2$ and the third wavelength $\lambda 3$ are disposed, and that the optical components for the second wavelength $\lambda 2$ and the third wavelength $\lambda 3$ may be exposed to light of the first wavelength $\lambda 1$.

The filter 20 may be operable to reflect the leaked light 23. In the case where the leaked light 23 is reflected, the reflected light may return to the optical system for guiding light of the first wavelength $\lambda 1$, with the result that the returned light beam may reach the first laser light source 1. In this occasion, a certain measure may be necessary, because the signal quality of the optical pickup device may be slightly degraded due to the returning light. In the case, however, the amount of reflection light of the leaked light 23 is significantly small with respect to the emission light amount of the first laser light source 1, a reflective filter may be used as the filter 20. Similarly to the above, use of the reflective filter is advantageous in preventing or suppressing the leaked light 23 from being incident into an optical system, where optical components for the second wavelength $\lambda 2$ and the third wavelength $\lambda 3$ are disposed; and preventing or suppressing the optical components for the second wavelength $\lambda 2$ and the third wavelength $\lambda 3$ from being exposed to light of the first wavelength $\lambda 1$.

The above arrangement is advantageous in securing long-term recording/reproducing quality of the optical pickup device, and sufficiently suppressing a rise in running cost or initial cost of the optical pickup device, without the need of using a component having light resistance against blue light, as the optical components for the second wavelength $\lambda 2$ and the third wavelength $\lambda 3$.

In the embodiment, the filter 20 may be e.g. a generally available dielectric thin film such as a wavelength selective thin film whose transmittance (or reflectance) with respect to light of the first wavelength $\lambda 1$ is selectively designed. In this arrangement, the thickness of the filter 20 can be substantially reduced to the order of μm or less. Thereby, there is no need of securing a large space for installing the filter 20 between the first rise-up mirror 5 and the second rise-up mirror 15. Accordingly, the first rise-up mirror 5 and the second rise-up mirror 15 can be disposed close to each other with a distance corresponding to the thickness of the filter 20. Even in the case where the filter 20 is disposed at a position other than between the first rise-up mirror 5 and the second rise-up mirror 15, the thin film filter does not require a large installation space. Accordingly, the above arrangement is advantageous in miniaturizing the optical pickup device.

At least one or more optical components constituting the second optical system 18 is made of a resin material. For instance, the collimator lens 14, the second rise-up mirror 15, and the second objective lens 16 are made of a resin material. Among parts which may cause a problem relating to light resistance resulting from exposure to a light flux of the first wavelength $\lambda 1$, such as wavefront aberration degradation or transmittance lowering, an optical component made of a resin material is most likely to be affected by light. In view of this, in the case where at least one or more optical components made of a resin material are used in the second optical system, the effect of the invention is most advantageously obtained.

In the first embodiment, the first laser light is blue laser light of the first wavelength $\lambda 1$ from 390 nm to 420 nm. This is because, generally, as the wavelength is shortened, the power density of light is increased, and a problem relating to light resistance is caused. In view of this, similarly to the above case, use of a light beam of a wavelength shorter than the first wavelength $\lambda 1$ e.g. in a UV wavelength region may cause a problem relating to light resistance, such as wavefront aberration degradation or transmittance lowering. Accordingly, similarly to the above case, in the case where the wavelength of a light source is shorter than the first wavelength $\lambda 1$, it is necessary to impart light resistance to the optical components for the second wavelength $\lambda 2$ and the third wavelength $\lambda 3$. Similarly to the above, all the effects of the first embodiment can be obtained by providing the filter 20 with a function of blocking a light beam of a wavelength shorter than the first wavelength $\lambda 1$.

In this embodiment, the filter 20 is disposed close to a surface of the second rise-up mirror 15. Alternatively, the filter 20 may be disposed on at least one surface of the first rise-up mirror 5, other than a surface thereof on which the first light beam is bent. In the modification, preferably, the filter 20 may be operable to absorb the first light beam having the first wavelength $\lambda 1$, with a transmitted component or a reflected component of the first light beam being 5% or less with respect to the first light beam before absorption. Further alternatively, the filter 20 may reflect the first light beam having the first wavelength $\lambda 1$, or have a reflectance of 5% or less with respect to the first light beam having the first wavelength $\lambda 1$.

Second Embodiment

FIGS. 3A through 3C are enlarged side views of rise-up mirrors in optical pickup devices in accordance with the second embodiment. Elements in FIGS. 3A through 3C substantially identical or equivalent to those in FIG. 2B are indicated with the same reference numerals, and description thereof is omitted herein. The arrangement and the effect of the optical pickup devices of the second embodiment are substantially the same as the arrangement and the effect of the optical pickup device of the first embodiment shown in FIG. 2A.

Referring to FIG. 3A, a filter 20 for absorbing light of the first wavelength $\lambda 1$ is disposed on a reflection surface of a first rise-up mirror 5. In this arrangement, preferably, the filter 20 may be operable to absorb or reflect light of the first wavelength $\lambda 1$, and have a transmittance of 5% or less with respect to the light of the first wavelength $\lambda 1$. With use of the filter 20 having the above characteristics, there is no or less likelihood that leaked light 23, as an unwanted component, may be transmitted through the reflection surface of the first rise-up mirror 5. Accordingly, there is no or less likelihood that optical components for the second wavelength $\lambda 2$ and the third wavelength $\lambda 3$ may be exposed to blue light. In this arrangement, the filter 20 may be a filter operable to reflect a blue light beam 21, and having a transmittance of 5% or less with respect to the blue light beam 21. In the modification, substantially the same effect as described above can be obtained. Further, in this arrangement, substantially the same effect as described above can be obtained by setting a transmittance of the reflection surface of the first rise-up mirror 5 with respect to the blue light beam 21 to 5% or less.

Preferably, the filter 20 may be attached to the entirety of the reflection surface of the first rise-up mirror 5. Attaching the filter 20 to the entirety of the reflection surface of the first rise-up mirror 5 enables to prevent scattered light in the vicinity of an apex of the first rise-up mirror 5 from being incident into a second optical system 18.

Referring to FIG. 3B, a filter 20 for absorbing light of the first wavelength $\lambda 1$ is disposed on a reflection surface of a second rise-up mirror 15. In this arrangement, preferably, the filter 20 may be operable to absorb or reflect light of the first wavelength $\lambda 1$, and have a transmittance of 5% or less with respect to the light of the first wavelength $\lambda 1$. The filter 20 having the above characteristics is capable of blocking substantially all the amount of leaked light 23, as an unwanted component, which has been transmitted through a reflection surface of a first rise-up mirror 5. Accordingly, there is no or less likelihood that optical components for the second wavelength $\lambda 2$ and the third wavelength $\lambda 3$ may be exposed to blue light at a position other than the reflection surface of the second rise-up mirror 15. Further, in this arrangement, the filter 20 may be a filter operable to reflect the leaked light 23, and having a transmittance of 5% or less with respect to light of the first wavelength $\lambda 1$. In the modification, substantially the same effect as described above can be obtained. Further, in this arrangement, substantially the same effect as described above can be obtained by setting a transmittance of the reflection surface of the second rise-up mirror 15 with respect to the light of the first wavelength λ1 to 5% or less.

Referring to FIG. 3C, a filter 20 for absorbing light of the first wavelength λ1 is disposed on a bottom surface of a first rise-up mirror 5 and a bottom surface of a second rise-up mirror 15, in place of a reflection surface of the first rise-up mirror 5 or a reflection surface of the second rise-up mirror 15. In this arrangement, preferably, the filter 20 may be operable to absorb or transmit light of the first wavelength λ1, and have a reflectance of 5% or less with respect to the light of the first wavelength λ1. The filter 20 having the above characteristics is capable of absorbing leaked light 23 which causes in-plane reflection in the interior of the first rise-up mirror 5 or the second rise-up mirror 15. Thereby, there is no or less likelihood that optical components for the second wavelength λ2 and the third wavelength λ3 may be exposed to blue light.

Further, in this arrangement, the filter 20 may be a filter operable to reflect the leaked light 23, and have a reflectance of 5% or less with respect to the light of the first wavelength λ1. In the modification, substantially the same effect as described above can be obtained. Further, in this arrangement, the filter 20 may be disposed on a side surface of the first rise-up mirror 5 and a side surface of the second rise-up mirror 15, in addition to the bottom surface of the first rise-up mirror 5 and the bottom surface of the second rise-up mirror 15. The modification is more advantageous in suppressing in-plane reflection of the leaked light 23, and suppressing exposure of the optical components for the second wavelength λ2 and the third wavelength λ3 to blue light.

Applying one of the above arrangements is advantageous in securing long-term recording/reproducing quality of the optical pickup device, and sufficiently suppressing a rise in running cost or initial cost of the optical pickup device, without the need of using a component having light resistance against blue light, as the optical components for the second wavelength λ2 and the third wavelength λ3.

In this embodiment, the first rise-up mirror 5 and the second rise-up mirror 15 are individual parts. Alternatively, the two parts may be unified into one unit by attaching the two parts by an adhesive. Further alternatively, a single rise-up mirror provided with at least one reflection surface for reflecting light of the first wavelength λ1, and one reflection surface for reflecting light of the second wavelength λ2 and light of the third wavelength λ3, may be used. In the modification, substantially the same effect as this embodiment can be obtained.

In this embodiment, each of the first rise-up mirror 5 and the second rise-up mirror 15 is formed of a prism having a reflection surface formed on a mirror material and exposed to the air. Alternatively, a reflection surface of each of the first rise-up mirror 5 and the second rise-up mirror 15 may be sandwiched between two prisms, as shown in FIGS. 4A through 4D, to enhance reliability of the reflection surface. In the modifications, substantially the same effect as this embodiment can be obtained.

FIGS. 4A through 4D are enlarged side views of rise-up mirrors in optical pickup devices as modifications of the second embodiment. Elements in FIGS. 4A through 4D substantially identical or equivalent to those in FIG. 2B are indicated with the same reference numerals, and description thereof is omitted herein. The arrangement and the effect of the optical pickup devices as the modifications of the second embodiment are substantially the same as the arrangement and the effect of the optical pickup device of the first embodiment shown in FIG. 2A.

Referring to FIGS. 4A through 4D, a first rise-up mirror 5 and a second rise-up mirror 15 each is constructed in such a manner that a reflection surface thereof is sandwiched prism.

Figure 4C:
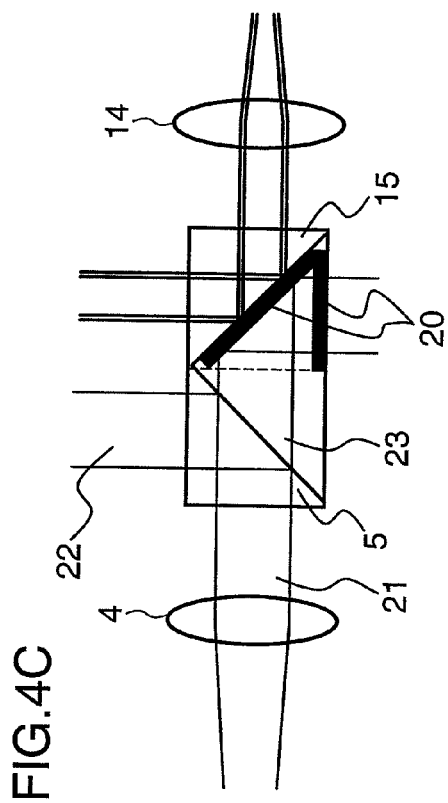
FIGS. 4A through 4D are enlarged side views of rise-up mirrors in optical pickup devices as modifications of the second embodiment.
Figure 4D:
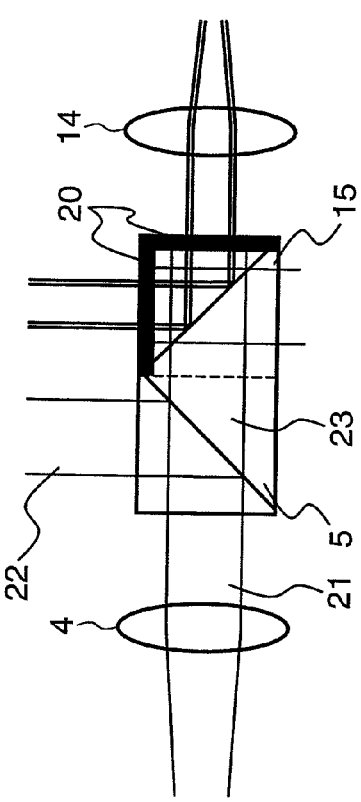
Figure 4A:
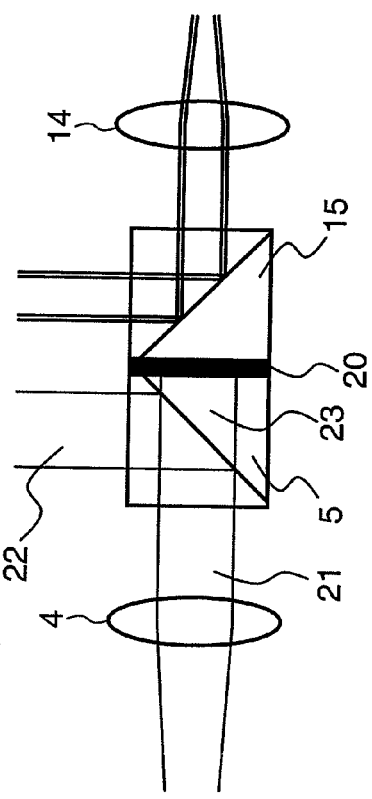

Referring to FIG. 4A, a filter 20 for absorbing light of the first wavelength λ1 is disposed between the first rise-up mirror 5 and the second rise-up mirror 15. In this arrangement, preferably, the filter 20 may be operable to absorb or reflect the light of the first wavelength λ1, and have a transmittance of 5% or less with respect to the light of the first wavelength λ1. Further, in this arrangement, the filter 20 may be a filter operable to reflect a blue light beam 21 and having a transmittance of 5% or less with respect to the blue light beam 21.

Figure 4B:
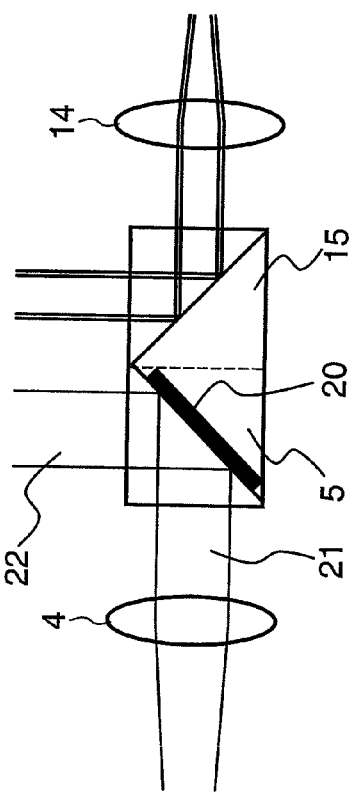

Referring to FIG. 4B, a filter 20 for absorbing light of the first wavelength λ1 is disposed on a reflection surface of the first rise-up mirror 5. In this arrangement, preferably, the filter 20 may be operable to absorb or reflect light of the first wavelength λ1, and have a transmittance of 5% or less with respect to the light of the first wavelength λ1. Further, in this arrangement, the filter 20 may be a filter operable to reflect a blue light beam 21, and having a transmittance of 5% or less with respect to the blue light beam 21. Further alternatively, the transmittance of the reflection surface of the first rise-up mirror 5 may be 5% or less with respect to the blue light beam 21.

Referring to FIG. 4C, a filter 20 for absorbing light of the first wavelength λ1 is disposed on a reflection surface and a bottom surface of the second rise-up mirror 15. In this arrangement, preferably, the filter 20 may be operable to absorb or reflect light of the first wavelength λ1, and have a transmittance of 5% or less with respect to the light of the first wavelength λ1. Further, in this arrangement, the filter 20 may be a filter operable to reflect a blue light beam 21, and having a transmittance of 5% or less with respect to the blue light beam 21. In the modification, leaked light 23 which has been reflected on the filter 20 disposed on the reflection surface of the second rise-up mirror 15 can be absorbed by the filter 20 disposed on the bottom surface of the second rise-up mirror 15. Further alternatively, the filter 20 disposed on the bottom surface of the second rise-up mirror 15 may transmit the leaked light 23.

Referring to FIG. 4D, a filter 20 for absorbing light of the first wavelength λ1 is disposed on an exit surface of a second rise-up mirror 15 from which the second laser light or the third laser light exits, and an incident surface of the second rise-up mirror 15 on which the second laser light or the third laser light is incident. In this arrangement, preferably, the filter 20 may be operable to absorb or reflect light of the first wavelength λ1, and have a transmittance of 5% or less with respect to the light of the first wavelength λ1. Further, in this arrangement, the filter 20 may be a filter operable to reflect a blue light beam 21, and having a transmittance of 5% or less with respect to the blue light beam 21. The filter 20 is operable to absorb or reflect light of the first wavelength λ1, and transmit light of the second wavelength λ2 and light of the third wavelength λ3.

In the second embodiment, substantially the same effects as the first embodiment can be obtained by using the filters 20.

Third Embodiment

FIGS. 5A through 5D are enlarged side views of rise-up mirrors in optical pickup devices in accordance with the third embodiment. Elements in FIGS. 5A through 5D substantially identical or equivalent to those in FIG. 2B are indicated with the same reference numerals, and description thereof is omitted herein. The arrangement and the effect of the optical pickup devices of the third embodiment are substantially the same as the arrangement and the effect of the optical pickup device of the first embodiment shown in FIG. 2A.

In this embodiment, a first rise-up mirror 5 and a second rise-up mirror 15 are each constituted of a flat plate mirror, in place of a prism. A flat plate mirror is advantageous in fabricating a part, as compared with a prism mirror. In use of a flat plate mirror, however, leaked light 23 transmitting through the first rise-up mirror 5 is radiated from a surface of the first rise-up mirror 5 opposite to a reflection surface thereof in a direction parallel to a light flux before reflection. As a result, as compared with the first embodiment and the second embodiment, optical components for the second wavelength $\lambda 2$ and the third wavelength $\lambda 3$ are likely to be exposed to the leaked light 23. In view of this, in FIG. 5A, a filter 20 for absorbing light of the first wavelength $\lambda 1$ is disposed between two mirrors (i.e. the first rise-up mirror 5 and the second rise-up mirror 15). In this arrangement, preferably, the filter 20 may be operable to absorb or reflect light of the first wavelength $\lambda 1$, and have a transmittance of 5% or less with respect to the light of the first wavelength $\lambda 1$. The filter 20 having the above characteristics is capable of blocking substantially all the amount of the leaked light 23, as an unwanted component, which has been transmitted through the reflection surface of the first rise-up mirror 5. Accordingly, there is no or less likelihood that optical components for the second wavelength $\lambda 2$ and the third wavelength $\lambda 3$ may be exposed to blue light at a position other than the reflection surface of the second rise-up mirror 15. Further, in this arrangement, the filter 20 may be a filter operable to reflect the leaked light 23, and having a transmittance of 5% or less with respect to light of the first wavelength $\lambda 1$. In the modification, substantially the same effect as described above can be obtained.

Figure 5A:
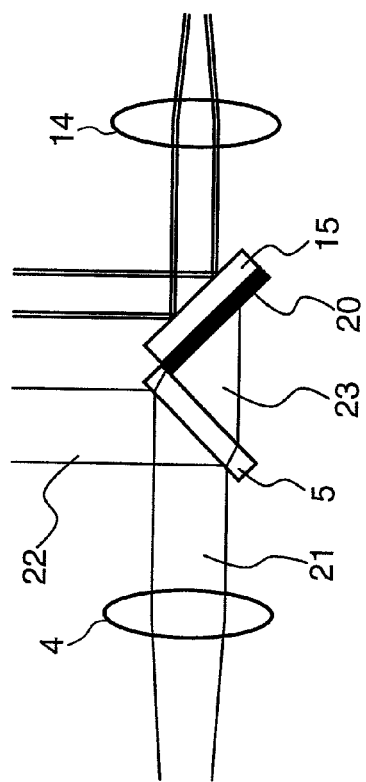
FIGS. 5A through 5D are enlarged side views of rise-up mirrors in optical pickup devices in accordance with a third embodiment of the invention.
Figure 5C:
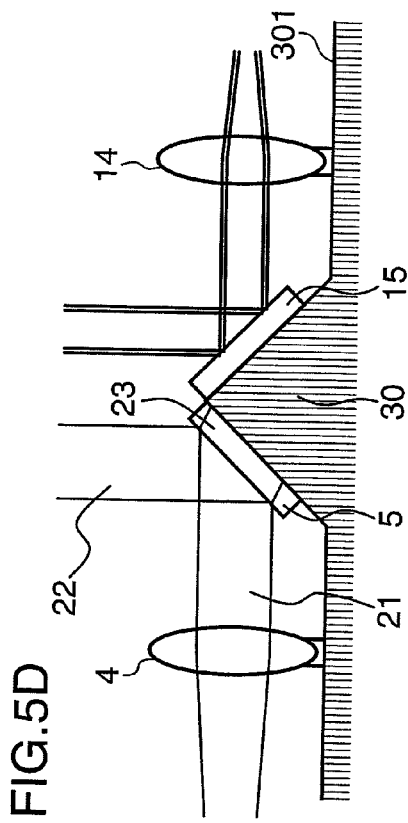
Figure 5B:
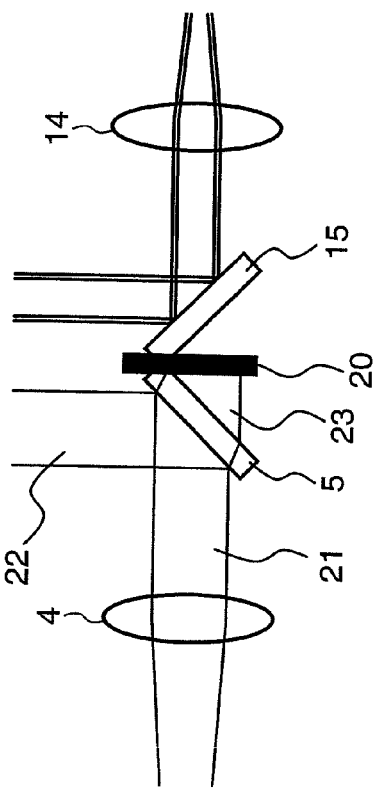

Referring to FIG. 5B, a filter 20 for absorbing light of the first wavelength $\lambda 1$ is disposed on a surface of the first rise-up mirror 5 opposite to a reflection surface thereof. In this arrangement, preferably, the filter 20 may be operable to absorb or reflect light of the first wavelength $\lambda 1$, and have a transmittance of 5% or less with respect to the light of the first wavelength $\lambda 1$. The filter 20 having the above characteristics is advantageous in eliminating or suppressing leaked light 23, as an unwanted component, which has been transmitted through the reflection surface of the first rise-up mirror 5. Accordingly, there is no or less likelihood that optical components for the second wavelength $\lambda 2$ and the third wavelength $\lambda 3$ may be exposed to blue light. Further alternatively, the filter 20 may be disposed on a reflection surface of the first rise-up mirror 5 on which a blue light beam 21 is reflected, or a surface of the first rise-up mirror opposite to the reflection surface thereof. In the modification, substantially the same effect as described above can be obtained. Further, in this arrangement, the filter 20 may be a filter operable to reflect the blue light beam 21, and having a transmittance of 5% or less with respect to the blue light beam 21. In the modification, substantially the same effect as described above can be obtained. Further, in this arrangement, substantially the same effect as described above can be obtained by setting a transmittance of the reflection surface of the first rise-up mirror 5 with respect to the blue light beam 21 to 5% or less.

Referring to FIG. 5C, a filter 20 for absorbing light of the first wavelength $\lambda 1$ is disposed on a surface of the second rise-up mirror 15 opposite to a reflection surface thereof. In this arrangement, preferably, the filter 20 may be operable to absorb or reflect light of the first wavelength $\lambda 1$, and have a transmittance of 5% or less with respect to the light of the first wavelength $\lambda 1$. The filter 20 having the above characteristics is capable of blocking substantially all the amount of leaked light 23, as an unwanted component, which has been transmitted through the reflection surface of the first rise-up mirror 5. Accordingly, there is no or less likelihood that optical components for the second wavelength $\lambda 2$ and the third wavelength $\lambda 3$ may be exposed to blue light. Further alternatively, in this arrangement, the filter 20 may be a filter operable to reflect the leaked light 23, and having a transmittance of 5% or less with respect to light of the first wavelength $\lambda 1$. In the modification, substantially the same effect as described above can be obtained. Further alternatively, the filter 20 may be disposed on a reflection surface of the second rise-up mirror 15 on which a red light beam or an infrared light beam is reflected, or a surface of the second rise-up mirror 15 opposite to the reflection surface thereof. In the modification, substantially the same effect as described above can be obtained. Further, in this arrangement, substantially the same effect as described above can be obtained by setting a transmittance of the reflection surface of the second rise-up mirror 15 with respect to light of the first wavelength $\lambda 1$ to 5% or less.

Figure 5D:
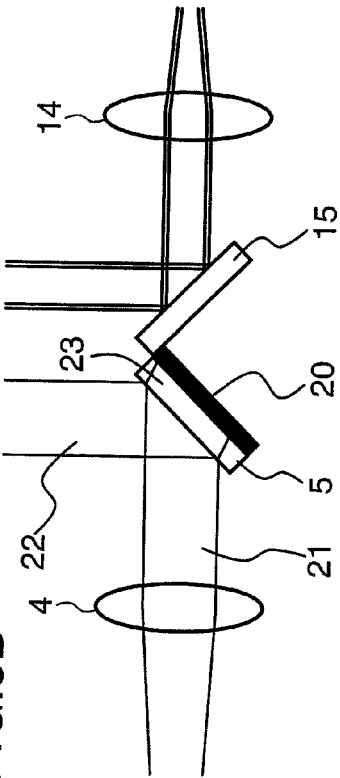

Referring to FIG. 5D, the first rise-up mirror 5 and the second rise-up mirror 15 are disposed on a holder 30 of a triangular prismatic shape having a right-angled triangle in cross section. The holder 30 is formed on an optical base block 301 for supporting an optical component. The holder 30 is made of a metallic material such as zinc so that light of the first wavelength $\lambda 1$ is not transmitted. The holder 30 having the above arrangement is inoperable to transmit leaked light 23 which has been transmitted through the first rise-up mirror 5. Accordingly, there is no or less likelihood that optical components for the second wavelength $\lambda 2$ and the third wavelength $\lambda 3$ may be exposed to blue light. In this embodiment, the holder 30 is made of a metallic material such as zinc. Alternatively, as far as a material is incapable of transmitting light of the first wavelength $\lambda 1$, aluminum or a resin material such as PPS (polyphenylene sulfide) may be used, and an expansion coefficient of the material, a cost merit, or a like factor may be determined depending on a purpose of use. In the modification, the optical components for the second wavelength $\lambda 2$ and the third wavelength $\lambda 3$ are less likely to be exposed to blue light, in the similar manner as described in the effect of the above arrangement.

The holder 30 may be formed integrally with the optical base block 301 to increase the precision in mounting position of the first rise-up mirror 5. In the modification, similarly to the above, there is no likelihood that optical components for the second wavelength $\lambda 2$ and the third wavelength $\lambda 3$ may be exposed to blue light. Further, in the case where a light blocking member is constituted of a member made of a metallic material requiring a certain volume, the arrangement as shown in FIG. 5D is advantageous in disposing two rise-up mirrors in close proximity to each other, thereby enabling to miniaturize the optical pickup device.

Applying one of the above arrangements is advantageous in securing long-term recording/reproducing quality of the optical pickup device, and sufficiently suppressing a rise in running cost or initial cost of the optical pickup device, without the need of using a component having light resistance against blue light, as the optical components for the second wavelength $\lambda 2$ and the third wavelength $\lambda 3$.

In the third embodiment, substantially the same effects as the first embodiment can be obtained by using the filters 20.

Fourth Embodiment

FIGS. 6A through 6C are enlarged side views of rise-up mirrors in optical pickup devices in accordance with the fourth embodiment. Elements in FIGS. 6A through 6C substantially identical or equivalent to those in FIG. 2B are indicated with the same reference numerals, and description thereof is omitted herein. The arrangement and the effect of the optical pickup devices of the fourth embodiment are substantially the same as the arrangement and the effect of the optical pickup device of the first embodiment shown in FIG. 2A.

Referring to FIGS. 6A through 6C, a lens holder 31 is a part of an objective lens actuator for performing focus driving or tracking driving with respect to an optical disc. The lens holder 31 holds a first objective lens 6, a second objective lens 16, and a like component. Upon irradiation of a blue light beam of the first wavelength λ1 in the vicinity of an apex of a first rise-up mirror 5, the blue light beam is scattered, and scattered light 25 is generated.

Referring to FIG. 6A, in the optical pickup device, a partition wall 26 is formed in the lens holder 31. The partition wall 26 is operable to define an optical path of the first objective lens 6 and an optical path of the second objective lens 16, and cut off the scattered light 25. The partition wall 26 is disposed in the lens holder 31 between an optical path of the first laser light, and an optical path of the second laser light or the third laser light, and is operable to absorb or reflect light of the first wavelength λ1. The partition wall 26 has a length from an end portion of an exit port of the lens holder 31 to an end portion of an incident port of the lens holder 31. Preferably, the partition wall 26 has a transmittance of 5% or less with respect to light of the first wavelength λ1. In this arrangement, there is no or less likelihood that the second objective lens 16 may be exposed to the scattered light 25.

Referring to FIG. 6B, in the optical pickup device, a wavelength selective filter 27 is provided in the lens holder 31. The wavelength selective filter 27 is operable to absorb or reflect light of the first wavelength λ1, and transmit light of the second wavelength λ2 and the third wavelength λ3. The wavelength selective filter 27 is disposed between an optical component loaded on the objective lens 16 or an actuator, and the second rise-up mirror 15, on an optical path of the second wavelength λ2 and the third wavelength λ3. Preferably, the wavelength selective filter 27 may have a transmittance of 5% or less with respect to light of the first wavelength λ1. In this arrangement, there is no or less likelihood that the second objective lens 16 may be exposed to scattered light 25.

Further, as shown in FIG. 6C, in the optical pickup device, a partition wall 26 and a wavelength selective filter may be used in combination. The modification is advantageous in further enhancing the effect of the fourth embodiment. Applying the modification is advantageous in securing long-term recording/reproducing quality of the optical pickup device, and sufficiently suppressing a rise in running cost or initial cost of the optical pickup device, without the need of using a component having light resistance against blue light, as all the optical components for the second wavelength λ2 and the third wavelength λ3.

In the fourth embodiment, substantially the same effects as the first embodiment can be obtained by using a filter 20.

Fifth Embodiment

Figure 7A:
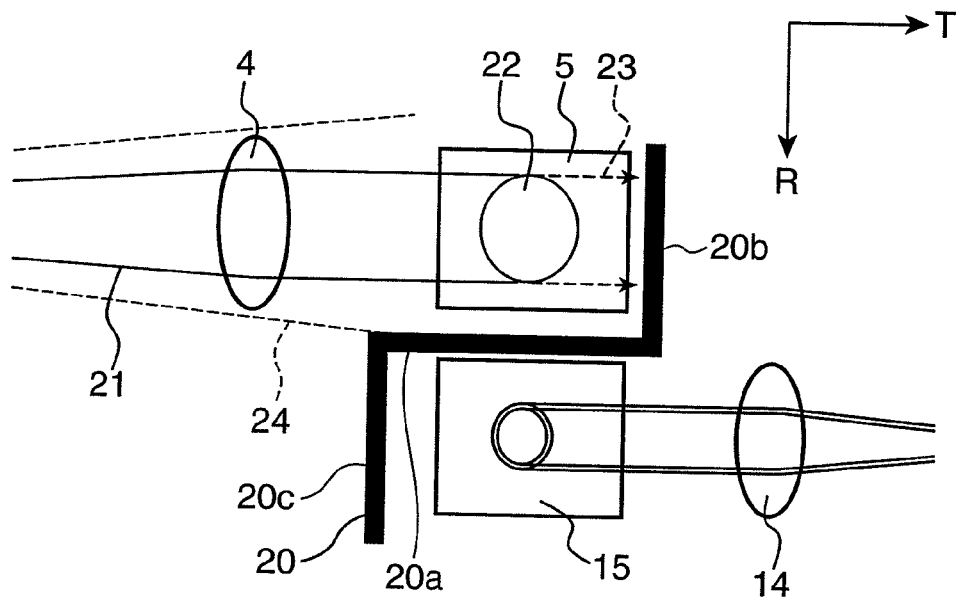
FIGS. 7A and 7B are enlarged views of rise-up mirrors in an optical pickup device in accordance with a fifth embodiment of the invention.
Figure 7B:
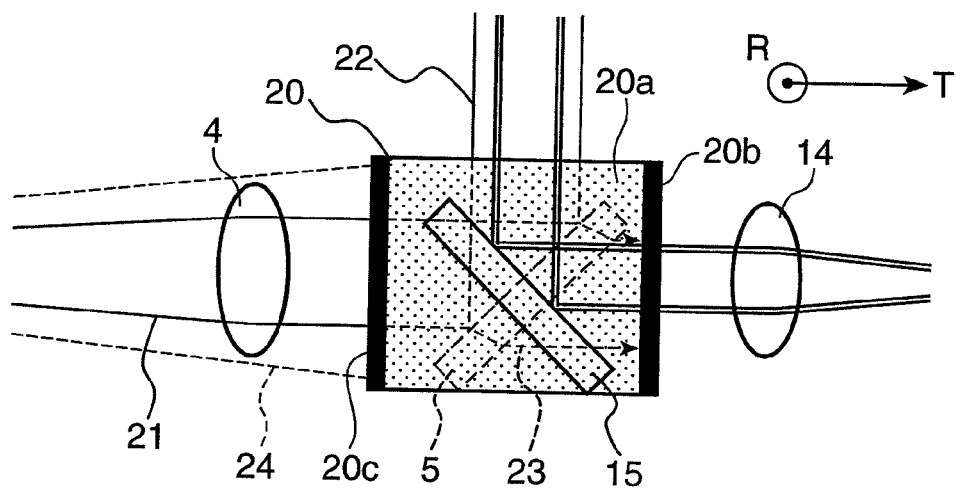

FIGS. 7A and 7B are enlarged views of rise-up mirrors in an optical pickup device in accordance with the fifth embodiment. FIG. 7A is a top plan view of the rise-up mirrors in the optical pickup device, and FIG. 7B is a side view of the rise-up mirrors shown in FIG. 7A. In FIGS. 7A and 7B, the radial direction R represents a radial direction of an optical disc, and the tangential direction T represents a direction perpendicular to the radial direction of the optical disc. (The same definition is applied to FIGS. 8A through 8F, and FIGS. 9A through 9C). Elements in FIGS. 7A and 7B substantially identical or equivalent to those in FIG. 2B are indicated with the same reference numerals, and description thereof is omitted herein. The arrangement and the effect of the optical pickup device of the fifth embodiment are substantially the same as the arrangement and the effect of the optical pickup device of the first embodiment shown in FIG. 2A.

Referring to FIGS. 7A and 7B, a first objective lens (not shown) and a second objective lens (not shown) are disposed side by side in the radial direction (i.e. the radial direction R) of an optical disc. Likewise, a first rise-up mirror 5 and a second rise-up mirror 15 are disposed side by side in the radial direction. In this arrangement, the two objective lenses are arranged on a seek centerline (a line passing the center point of an optical disc, and extending in parallel to the moving direction of the optical pickup device). Accordingly, in both of a first optical system 17 and a second optical system 18, a servo signal for focus control or tracking control can be stably obtained.

Referring to FIGS. 7A and 7B, unwanted light 24 is an unwanted component, other than a blue light beam 21 as a primary component to be condensed on an information recording surface of the optical disc, out of blue light beams of the first wavelength ?1 to be emitted from a first laser light source 1 (not shown). The unwanted light 24 may include light passing an outer region of one of the lenses constituting the first optical system 17, and unwanted inner reflection stray light in and out of an optical base block.

Referring to FIGS. 7A and 7B, a filter 20 for blocking light of the first wavelength λ1 is disposed at a position capable of blocking leaked light 23 and the unwanted light 24. Specifically, the filter 20 is constituted of a first filter portion 20a disposed between the first rise-up mirror 5 and the second rise-up mirror 15; a second filter portion 20b intersecting with an optical axis direction of the first laser light, and joined perpendicularly to one end of the first filter portion 20a; and a third filter portion 20c intersecting with an optical axis direction of the second laser light, and joined perpendicularly to the other end of the first filter portion 20a.

In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the leaked light 23 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

The rigidity of the optical base block can be increased by forming the first filter portion 20a, the second filter portion 20b, and the third filter portion 30c perpendicularly to each other on the optical base block.

The filter 20 may be operable to reflect the leaked light 23 and the unwanted light 24. In the case where the leaked light 23 or the unwanted light 24 is reflected, the reflected light may return to the optical system for guiding light of the first wavelength λ1, with the result that the returned light beam may reach the first laser light source 1. In this occasion, a certain measure may be necessary, because the signal quality of the optical pickup device may be slightly degraded due to the returning light. In the case, however, the amount of reflection light of the leaked light 23 or the unwanted light 24 is significantly small with respect to the emission light amount of the first laser light source 1, a reflective filter may be used as the filter 20. Similarly to the above, use of the reflective filter is advantageous in preventing or suppressing the leaked light 23 and the unwanted light 24 from being incident into an optical system, where optical components for the second wavelength λ2 and the third wavelength λ3 are disposed; and preventing or suppressing the optical components for the second wavelength λ2 and the third wavelength λ3 from being exposed to light of the first wavelength λ1.

In this embodiment, the first filter portion 20a, the second filter portion 20b, and the third filter portion 20c are disposed perpendicularly to each other. The invention is not specifically limited to the above. As far as the first filter portion 20a, the second filter portion 20b, and the third filter portion 20c are disposed at positions capable of blocking the leaked light 23 and the unwanted light 24, there is no need that the first filter portion 20a, the second filter portion 20b, and the third filter portion 20c are disposed perpendicularly to each other.

FIGS. 8A through 8F are enlarged top plan views of rise-up mirrors in optical pickup devices as a first modification of the fifth embodiment. Elements in FIGS. 8A through 8F substantially identical or equivalent to those in FIG. 2B are indicated with the same reference numerals, and description thereof is omitted herein. The arrangement and the effect of the optical pickup devices as the first modification of the fifth embodiment are substantially the same as the arrangement and the effect of the optical pickup device of the first embodiment shown in FIG. 2A.

Referring to FIGS. 8A through 8F, a first objective lens (not shown) and a second objective lens (not shown) are disposed side by side in the radial direction (i.e. the radial direction R) of an optical disc. Likewise, a first rise-up mirror 5 and a second rise-up mirror 15 are disposed side by side in the radial direction. As shown in FIGS. 8A through 8F, a filter 20 may have any shape and be arranged at any position, as far as the filter 20 is capable of blocking the leaked light 23 and the unwanted light 24.

Referring to FIG. 8A, a filter 20 is constituted of a first filter portion 20a disposed between the first rise-up mirror 5 and the second rise-up mirror 15; and a second filter portion 20b intersecting with an optical axis direction of the first laser light, and joined perpendicularly to one end of the first filter portion 20a. In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the leaked light 23 and the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

Referring to FIG. 8A, the first filter portion 20a and the second filter portion 20b are disposed perpendicularly to each other. The invention is not specifically limited to the above. As far as the first filter portion 20a and the second filter portion 20c are disposed at positions capable of blocking the leaked light 23 and the unwanted light 24, there is no need that the first filter portion 20a and the second filter portion 20b are disposed perpendicularly to each other.

Referring to FIG. 8B, a filter 20 is constituted of a first filter portion 20a disposed between the first rise-up mirror 5 and the second rise-up mirror 15; and a third filter portion 20c intersecting with an optical axis direction of the second laser light and joined perpendicularly to the other end of the first filter portion 20a. In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

Referring to FIG. 8B, the first filter portion 20a and the third filter portion 20c are disposed perpendicularly to each other. The invention is not specifically limited to the above. As far as the first filter portion 20a and the third filter portion 20c are disposed at positions capable of blocking the leaked light 23 and the unwanted light 24, there is no need that the first filter portion 20a and the third filter portion 20c are disposed perpendicularly to each other.

Referring to FIG. 8C, a filter 20 is disposed between the first rise-up mirror 5 and the second rise-up mirror 15. In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

Referring to FIG. 8D, a filter portion 20b intersects with an optical axis direction of the first laser light, and is disposed on a surface of the first rise-up mirror 5 other than an incident surface of the first laser light. A filter portion 20c intersects with an optical axis direction of the second laser light, and is disposed on a surface of the second rise-up mirror 15 other than an incident surface of the second laser light. In this arrangement, preferably, the filter portions 20b and 20c may be operable to absorb the leaked light 23 and the unwanted light 24, and have a transmittance of 5% or less with respect to light of the first wavelength λ1. With use of the filter portions 20b and 20c having the above characteristics, there is no or less likelihood that the leaked light 23 and the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

Referring to FIG. 8E, a filter 20 intersects with an optical axis direction of the second laser light, and is disposed on a surface of the second rise-up mirror 15 other than an incident surface of the second laser light. In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

Referring to FIG. 8F, a filter 20 intersects with an optical axis direction of the first laser light, and is disposed on a surface of the first rise-up mirror 5 other than an incident surface of the first laser light. In this arrangement, preferably, the filter 20 may be operable to absorb the leaked light 23 and the unwanted light 24, and have a transmittance of 5% or less with respect to light of the first wavelength λ1. With use of the filter 20 having the above characteristics, there is no or less likelihood that the leaked light 23 and the unwanted light 24 may be incident into the interior of an optical system, where optical components for the second wavelength λ2 and the third wavelength λ3 are disposed, and that the optical components for the second wavelength λ2 and the third wavelength λ3 may be exposed to light of the first wavelength λ1.

In FIG. 8F, the filter 20 may be attached to a surface of the first rise-up mirror 5 at a position adjacent to the second rise-up mirror 15. The modification enables to prevent leaked light from the first rise-up mirror 5 from being incident into the second rise-up mirror 15.

Figure 9A:
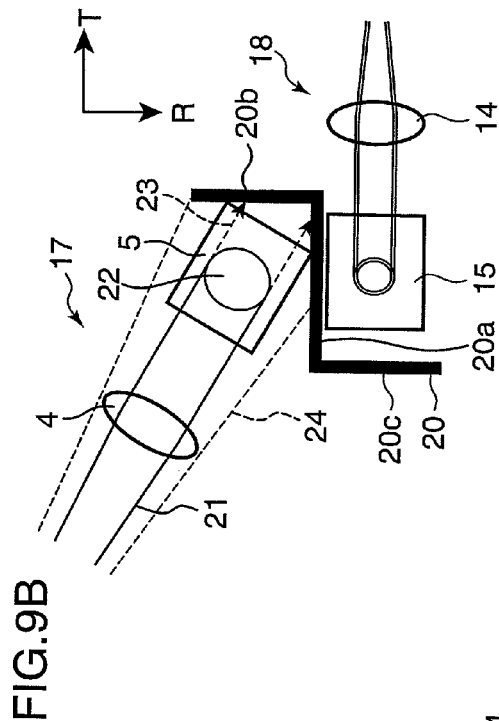
FIGS. 9A through 9C are enlarged top plan views of rise-up mirrors in optical pickup devices as a second modification of the fifth embodiment.
Figure 9B:
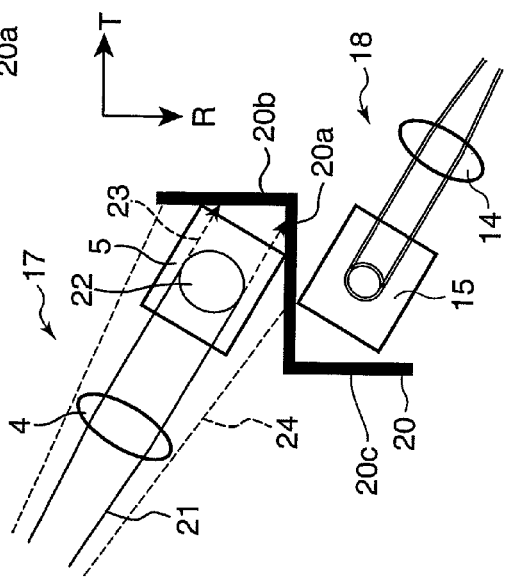
Figure 9C:
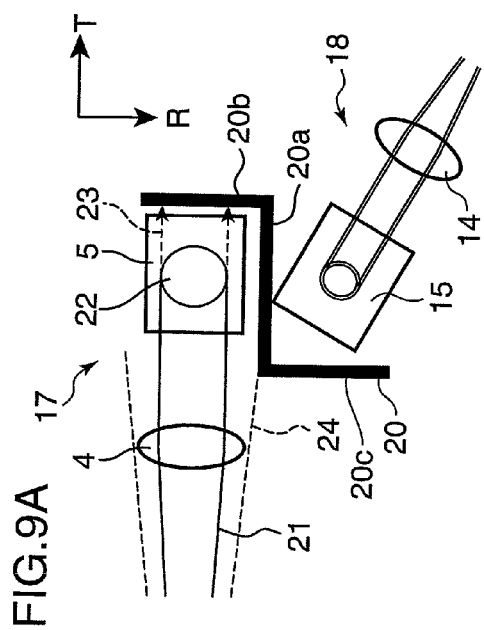

FIGS. 9A through 9C are enlarged top plan views of rise-up mirrors in optical pickup devices as a second modification of the fifth embodiment. Elements in FIGS. 9A through 9C substantially identical or equivalent to those in FIG. 2B are indicated with the same reference numerals, and description thereof is omitted herein. The arrangement and the effect of the optical pickup devices as the second modification of the fifth embodiment are substantially the same as the arrangement and the effect of the optical pickup device of the first embodiment shown in FIG. 2A.

Referring to FIGS. 9A through 9C, two objective lenses (not shown) are disposed side by side in the radial direction (i.e. the radial direction R) of an optical disc. However, one of the optical axis of a first optical system for guiding light to a first rise-up mirror 5, and the optical axis of a second optical system for guiding light to a second rise-up mirror 15 is displaced from a direction (i.e. the tangential direction T) perpendicular to the radial direction of the optical disc. This arrangement enables to reduce the outer dimension of the optical pickup device in the tangential direction.

The arranged position of a filter 20 in the second modification of the fifth embodiment is substantially the same as the arranged position of the filter 20 of the fifth embodiment shown in FIGS. 7A and 7B.

Referring to FIG. 9A, the optical axis of a first optical system 17 including a collimator lens 4 and a first rise-up mirror 5 is aligned parallel with the tangential direction, and the optical axis of a second optical system 18 including a collimator lens 14 and a second rise-up mirror 15 is tilted by 45 degrees with respect to the tangential direction.

Referring to FIG. 9B, the optical axis of a first optical system 17 including a collimator lens 4 and a first rise-up mirror 5 is tilted by 45 degrees with respect to the tangential direction, and the optical axis of a second optical system 18 including a collimator lens 14 and a second rise-up mirror 15 is aligned parallel with the tangential direction.

Referring to FIG. 9C, the optical axis of a first optical system 17 including a collimator lens 4 and a first rise-up mirror 5 is tilted by 45 degrees with respect to the tangential direction, and the optical axis of a second optical system 18 including a collimator lens 14 and a second rise-up mirror 15 is tilted by 45 degrees with respect to the tangential direction. Alternatively, a first filter portion 20a may be disposed in parallel to the optical axes of the first optical system 17 and the second optical system 18, in other words, may be tilted by 45 degrees with respect to the tangential direction; a second filter portion 20b may be disposed perpendicularly to the first filter portion 20a; and a third filter portion 20c may be disposed perpendicularly to the first filter portion 20a.

In the above arrangements, as shown in FIGS. 9A through 9C, disposing the filter 20 at a position capable of blocking the leaked light 23 and the unwanted light 24 enables to prevent optical components constituting the second optical system from being exposed to light of the first wavelength λ1, in the similar manner as described above.

Referring to FIGS. 9A through 9C, the first filter portion 20a, the second filter portion 20b, and the third filter portion 20c are disposed perpendicularly to each other. The invention is not specifically limited to the above. As far as the first filter portion 20a, the second filter portion 20b, and the third filter portion 20c are disposed at positions capable of blocking the leaked light 23 and the unwanted light 24, there is no need that the first filter portion 20a, the second filter portion 20b, and the third filter portion 20c are disposed perpendicularly to each other.

The above arrangement is advantageous in securing long-term recording/reproducing quality of the optical pickup device, and sufficiently suppressing a rise in running cost or initial cost of the optical pickup device, without the need of using a component having light resistance against blue light, as the optical components for the second wavelength λ2 and the third wavelength λ3.

In the fifth embodiment, substantially the same effects as the first embodiment can be obtained by using the filters 20.

Sixth Embodiment

FIG. 10A is a diagram showing an arrangement of an optical pickup device in accordance with the sixth embodiment.

Referring to FIG. 10A, the optical pickup device includes a laser light source 41, a beam shape forming element 42, a dual wavelength laser light source 51, a dichroic mirror 43, a collimator lens 44, a first rise-up mirror 45, a first objective lens (optical lens) 46, a second rise-up mirror 55, a second objective lens (optical lens) 56, a beam splitter 47, a detection lens 49, a photodetector 50, and a filter 20.

The laser light source 41 emits first laser light of a first wavelength λ1 (390 nm to 420 nm, in this embodiment, 405 nm is used as an example). The beam shape forming element 42 shapes the form of a far-field image of laser light. In the optical pickup device shown in FIG. 10A, an element other than the beam shape forming element 42 may be used. The dual wavelength laser light source 51 selectively emits one of second laser light of a second wavelength λ2 (640 to 670 nm, in this embodiment, 650 nm is used as an example), and third laser light of a third wavelength λ3 (770 to 800 nm, in this embodiment, 790 nm is used as an example).

The dichroic mirror 43 reflects the first laser light of the first wavelength λ1, and transmits the second laser light of the second wavelength λ2 and the third laser light of the third wavelength λ3. The collimator lens 44 converts the first laser light, the second laser light, and the third laser light from diverging light into parallel light.

The first rise-up mirror 45 bends an optical axis of the first laser light of the first wavelength λ1 toward the first objective lens 46. The first objective lens 46 condenses the first laser light of the first wavelength λ1 on an information recording surface of a first optical disc (not shown) having a substrate thickness of 0.1 mm. The second rise-up mirror 55 bends optical axes of the second laser light of the first wavelength λ2 and the third laser light of the third wavelength λ3 toward the second objective lens 56. The second objective lens 56 condenses the second laser light of the second wavelength λ2 on an information recording surface of a second optical disc (not shown) having a substrate thickness of 0.6 mm; and condenses the third laser light of the third wavelength λ3 on an information recording surface of a third optical disc (not shown) having a substrate thickness of 1.2 mm.

In this embodiment, a first light beam, a second light beam, and a third light beam are irradiated from an identical direction, and the optical axis of the first light beam to be incident into the first rise-up mirror 45 is aligned with the optical axis of the second light beam to be incident into the second rise-up mirror 55.

The beam splitter 47 transmits the first laser light reflected on the dichroic mirror 43, and transmits the second laser light and the third laser light that have been transmitted through the dichroic mirror 43. The beam splitter reflects the laser light reflected on the respective corresponding optical discs toward the photodetector 50. The detection lens 49 condenses the laser light reflected on the respective corresponding optical discs on the photodetector 50. The photodetector 50 receives the laser light reflected on the respective corresponding optical discs, and converts the received laser light into an electrical signal corresponding to the light amount of the received laser light.

The laser light source 41 and the dual wavelength laser light source 51 are each preferably a semiconductor laser light source. With use of the semiconductor laser light sources, an optical pickup device, and an optical information device incorporated with the optical pickup device can be miniaturized and light-weighted with a reduced power consumption.

In the case where a recording or reproducing operation is performed with respect to the first optical disc, a blue light beam of the first wavelength $\lambda 1$ to be emitted from the laser light source 41 has its shape formed by the beam shape forming element 42, is reflected by the beam splitter 43, and is transmitted through the beam splitter 47. Then, the blue light beam transmitted through the beam splitter 47 is converted into substantially parallel light by the collimator lens 44. The blue light beam, as substantially parallel light, has its optical axis bent substantially at a right angle by the first rise-up mirror 45, and is converted from linearly polarized light into circularly polarized light by a quarter wavelength plate (not shown). The blue light beam, as circularly polarized light, is condensed on the information recording surface of the first optical disc through a substrate of 0.1 mm in thickness by the refractive first objective lens 46.

The blue light beam reflected on the information recording surface of the first optical disc is propagated backward along the optical path; is converted into linearly polarized light in a direction displaced by a right angle with respect to the original optical path by the quarter wavelength plate; has its optical axis bent substantially at a right angle by the first rise-up mirror 45; and the focal length thereof is extended by the collimator lens 44. The blue light beam whose focal length has been extended is reflected on the beam splitter 47, and is incident into the photodetector 50. Then, the output of the photodetector 50 is calculated to obtain a servo signal to be used in focus control or tracking control and an information signal.

A red light beam of the second wavelength $\lambda 2$ and an infrared light beam of the third wavelength $\lambda 3$ to be emitted from the dual wavelength laser light source 51 are transmitted through the dichroic mirror 43 and the beam splitter 47, and are converted into substantially parallel light by the collimator lens 44. The red light beam and the infrared light beam, as substantially parallel light, are transmitted through the first rise-up mirror 45, and have their optical axes bent substantially at a right angle by the second rise-up mirror 55. Thereafter, the red light beam and the infrared light beam are irradiated onto the optical discs having a substrate thickness of 0.6 mm and 1.2 mm by the second objective lens 56, respectively.

The red light beam reflected on the information recording surface of the optical disc is propagated backward along the optical path, has its optical axis bent substantially at a right angle by the second rise-up mirror 55, is transmitted through the first rise-up mirror 45, and the focal length thereof is extended by the collimator lens 44. The red light beam and the infrared light beam whose focal length has been extended are reflected on the beam splitter 47, and incident into the photodetector 50. Then, the output of the photodetector 50 is calculated to obtain a servo signal to be used in focus control or tracking control and an information signal. The beam splitter 47 is an optical path splitting element provided with a polarization separation film allowing total reflection of linearly polarized light in one direction of light beams of the first wavelength $\lambda 1$, the second wavelength $\lambda 2$, and the third wavelength $\lambda 3$, and total transmittance of linearly polarized light in a direction displaced by a right angle with respect to the linearly polarized light in the one direction.

As described above, referring to FIG. 10A, a first optical system of the sixth embodiment is constituted of at least the optical components i.e. the laser light source 41, the beam shape forming element 42, the dichroic mirror 43, the beam splitter 47, the collimator lens 44, the first rise-up mirror 45, the first objective lens 46, the detection lens 49, and the photodetector 50; and a second optical system is constituted of at least the dual wavelength laser light source 51, the second rise-up mirror 55, and the second objective lens 56.

FIG. 10B is an enlarged side view of the rise-up mirrors shown in FIG. 10A. The filter 20 is disposed between the first rise-up mirror 45 and the second rise-up mirror 55 to absorb blue light. A blue light beam 21 to be incident into the first rise-up mirror 45 is separated into a first component 22 whose optical path is bent on a reflection surface of the first rise-up mirror 45, and a second component 23 which is incident into the interior of the first rise-up mirror 45 without being bent by the reflection surface of the first rise-up mirror 45.

The first component 22 is an important component to be irradiated onto the optical disc, but the second component 23 is an unwanted component which does not contribute to a signal of the optical disc. In this arrangement, preferably, the filter 20 is operable to absorb leaked light 23, and has a transmittance of 5% or less with respect to light of the first wavelength $\lambda 1$. With use of the filter having the above characteristics, there is no or less likelihood that the leaked light 23 may be incident into the interior of an optical system, where optical components dedicatedly used for the second wavelength $\lambda 2$ and the third wavelength $\lambda 3$ e.g. the second rise-up mirror 55 and the second objective lens 56 are disposed, and that the optical components dedicatedly used for the second wavelength $\lambda 2$ and the third wavelength $\lambda 3$ may be exposed to light of the first wavelength $\lambda 1$.

The filter 20 may be operable to reflect the leaked light 23. In the case where the leaked light 23 is reflected, the reflected light may return to the optical system for guiding light of the first wavelength $\lambda 1$, with the result that the returned light beam may reach the laser light source 41. In this occasion, a certain measure may be necessary, because the signal quality of the optical pickup device may be slightly degraded due to the returning light. In the case, however, the amount of reflection light of the leaked light 23 is significantly small with respect to the emission light amount of the laser light source 41, a reflective filter may be used as the filter 20. Similarly to the above, use of the reflective filter is advantageous in preventing or suppressing the leaked light 23 from being incident into an optical system, where optical components dedicatedly used for the second wavelength $\lambda 2$ and the third wavelength $\lambda 3$ are disposed; and preventing or suppressing the optical components dedicatedly used for the second wavelength $\lambda 2$ and the third wavelength $\lambda 3$ from being exposed to light of the first wavelength $\lambda 1$.

In the sixth embodiment, the dual wavelength laser light source 51 is operable to emit the second laser light of the second wavelength λ2 and the third laser light of the third wavelength λ3. Alternatively, in the case where the optical pickup device is incompatible with an optical disc having a substrate thickness of e.g. 1.2 mm, a laser light source for exclusively emitting the second laser light of the second wavelength λ2 may be provided, in place of the dual wavelength laser light source 51. In the modification, similarly to the above, there is no or less likelihood that the optical components dedicatedly used for the second wavelength λ2 such as the second rise-up mirror 55 and the second objective lens 56 may be exposed to light of the first wavelength λ1 by using the filter 20 as shown in the sixth embodiment.

The above arrangement is advantageous in securing long-term recording/reproducing quality of the optical pickup device, and sufficiently suppressing a rise in running cost or initial cost of the optical pickup device, without the need of using a component having light resistance against blue light, as the optical components dedicatedly used for the second wavelength λ2 and the third wavelength λ3.

In the following, modifications of the sixth embodiment are described referring to FIGS. 11A through 12B. FIGS. 11A through 11C are enlarged side views of rise-up mirrors in optical pickup devices as first through the third modifications of the sixth embodiment.

In the optical pickup device shown in FIG. 11A, a filter 20 is disposed on a backside surface of a first rise-up mirror 45 opposite to a reflection surface thereof. Similarly to the above, the filter 20 is capable of blocking leaked light 23. Accordingly, there is no likelihood that a second rise-up mirror 55 and a second objective lens 56 may be exposed to light of the first wavelength λ1.

In the optical pickup device shown in FIG. 11B, a filter 20 is disposed on a reflection surface of a second rise-up mirror 55. In this arrangement, preferably, the filter 20 may have a reflectance of 5% or less with respect to light of the first wavelength λ1. With use of the filter 20 having the above characteristics, there is no or less likelihood that leaked light 23 may be reflected on the second rise-up mirror 55 and incident into a second objective lens 56, and that the second objective lens 56 may be exposed to light of the first wavelength λ1. In this arrangement, the second rise-up mirror is a component other than the optical components constituting the second optical system.

In the optical pickup device shown in FIG. 11C, a filter 20 is disposed between a second rise-up mirror 55 and a second objective lens 56. In this arrangement, preferably, the filter 20 may have a transmittance of 5% or less with respect to light of the first wavelength λ1. The filter 20 having the above characteristics is capable of blocking leaked light 23 reflected on the second rise-up mirror 55, thereby enabling to prevent or suppress the second objective lens 56 from being exposed to light of the first wavelength Xi. Similarly to the above, in this arrangement, the second rise-up mirror 55 is a component other than the optical components constituting the second optical system.

Figure 12A:
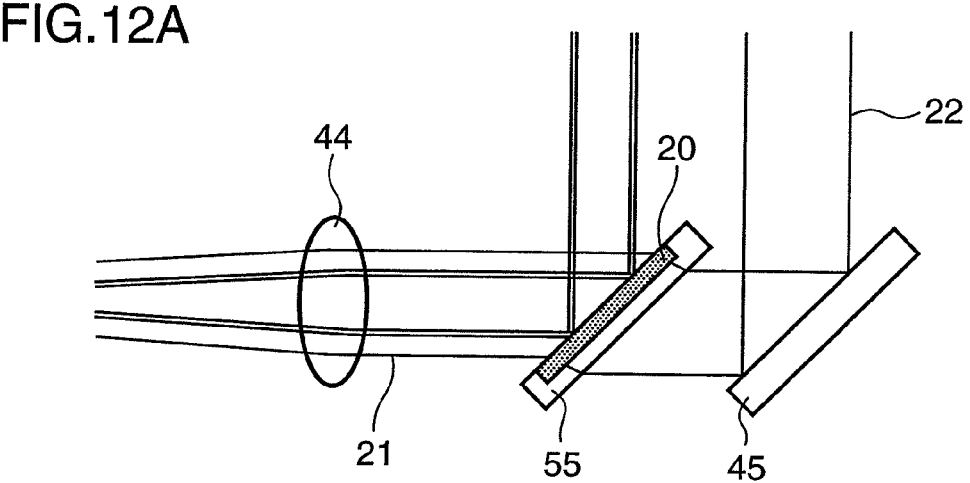
FIGS. 12A and 12B are enlarged side views of rise-up mirrors in optical pickup devices as fourth and fifth modifications of the sixth embodiment.
Figure 12B:
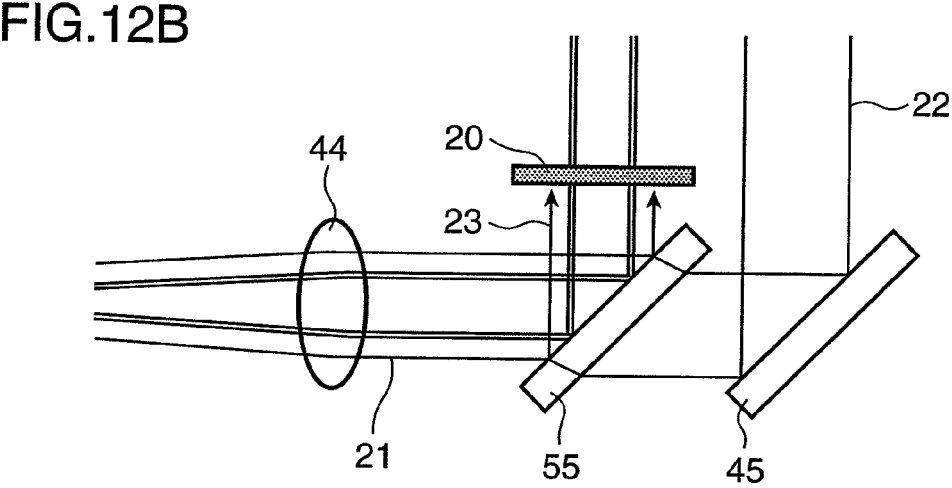

FIGS. 12A and 12B are enlarged side views of rise-up mirrors in optical pickup devices as fourth and fifth modifications of the sixth embodiment, respectively. The first objective lens 46 and the second objective lens 56 are disposed at reverse positions between the optical pickup devices shown in FIGS. 12A and 12B, and the optical pickup devices shown in FIGS. 10A through 11C.

In the optical pickup device shown in FIGS. 12A, a filter 20 is disposed on a reflection surface of a second rise-up mirror 55. In this arrangement, preferably, the filter 20 may have a reflectance of 5% or less with respect to light of the first wavelength λ1. With use of the filter 20 having the above characteristics, there is no or less likelihood that leaked light 23 may be reflected on the second rise-up mirror 55 and incident into a second objective lens 56, and that the second objective lens 56 may be exposed to light of the first wavelength λ1.

In the optical pickup device shown in FIGS. 12B, a filter 20 is disposed between a second rise-up mirror 55 and a second objective lens 56. In this arrangement, preferably, the filter 20 may have a transmittance of 5% or less with respect to light of the first wavelength λ1. The filter 20 having the above characteristics is capable of blocking leaked light 23 reflected on the second rise-up mirror 55, thereby enabling to prevent or suppress the second objective lens 56 from being exposed to light of the first wavelength λ1.

In the arrangements shown in FIGS. 12A and 12B, the second rise-up mirror 55 is a component constituting the first optical system. Accordingly, it is necessary to impart light resistance against light of the first wavelength λ1 to the second rise-up mirror 55.

In the sixth embodiment, substantially the same effects as the first embodiment can be obtained by using the filters 20.

Seventh Embodiment

Figure 13:
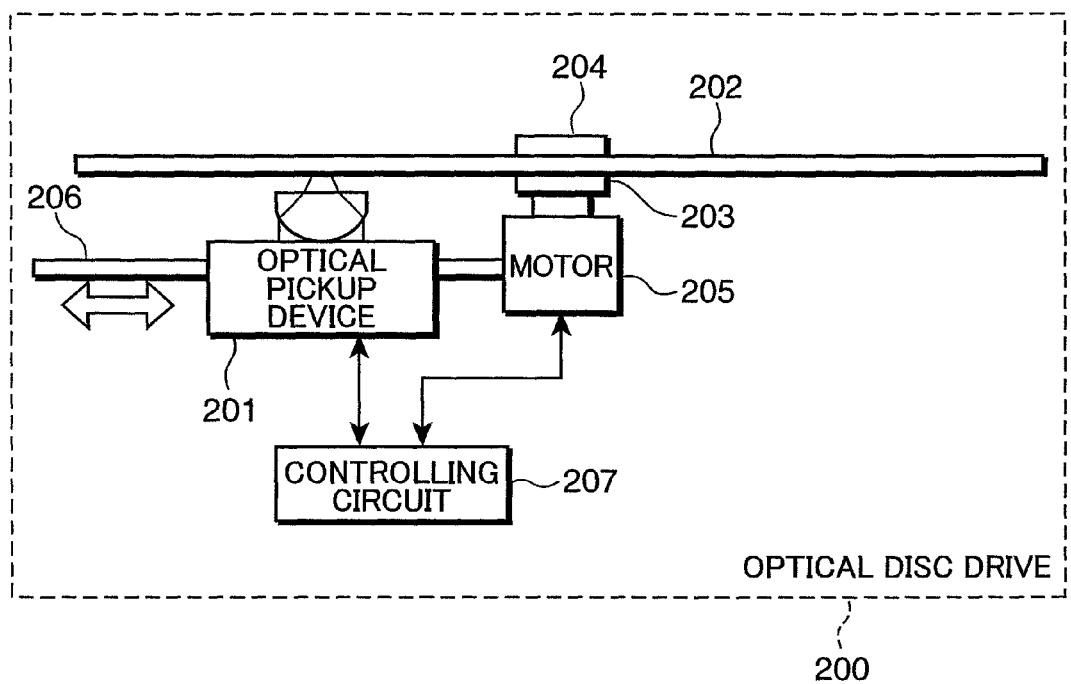
FIG. 13 is a diagram showing an entire arrangement of an optical disc drive as an example of an optical information device in accordance with a seventh embodiment of the invention.

In this section, an optical information device incorporated with the inventive optical pickup device is described referring to FIG. 13. FIG. 13 is a diagram showing an entire arrangement of an optical disc drive, as an example of the optical information device in accordance with the seventh embodiment.

An optical disc drive 200 includes an optical pickup device 201, a motor (rotating system) 205, a traverse (moving) system 206, and a controlling circuit 207. An optical disc 202 is fixedly held between a turntable 203 and a clamper 204, and is rotated by the motor (rotating system) 205.

The optical pickup device 201 recited in any one of the first through the sixth embodiments is mounted on the traverse (moving) system 206. The traverse system 206 is operable to move the optical pickup device 201 in a radial direction of the optical disc 202. Thereby, light to be irradiated from the optical pickup device 201 is allowed to travel from an inner periphery of the optical disc 202 to an outer periphery thereof.

The controlling circuit 207 is operable to perform a focus control, a tracking control, a traverse control, and a rotation control of the motor 205, based on a signal outputted from the optical pickup device 201. The controlling circuit 207 is also operable to reproduce information based on a reproducing signal, or transmit a recorded signal to the optical pickup device 201.

Eighth Embodiment

Figure 14:
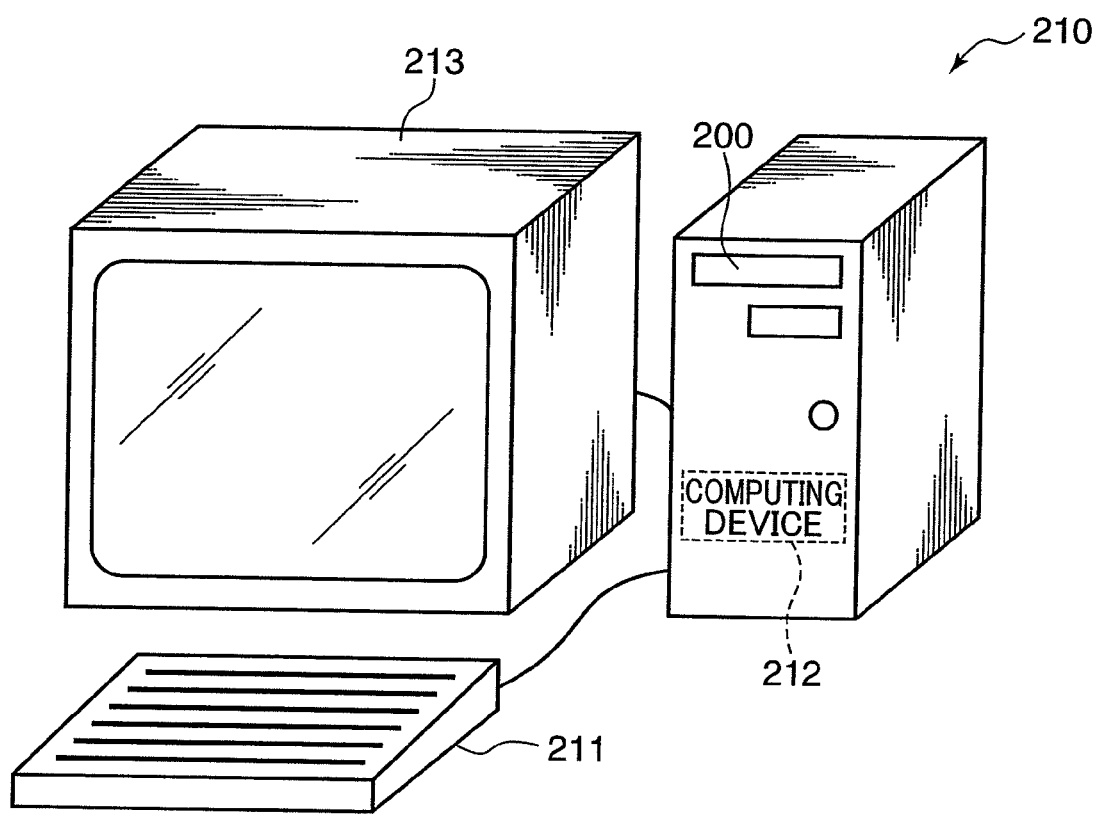
FIG. 14 is a schematic perspective view showing an entire arrangement of a computer in accordance with an eighth embodiment of the invention.

In this section, a computer incorporated with the optical disc drive (optical information device) 200 of the seventh embodiment is described referring to FIG. 14. FIG. 14 is a schematic perspective view showing an entire arrangement of the computer in accordance with the eighth embodiment.

Referring to FIG. 14, a personal computer (computer) 210 includes the optical disc drive 200 of the seventh embodiment, a keyboard (input section) 211 for allowing an operator to input information, a computing device 212 for performing a computation based on information inputted from the keyboard 211 and information reproduced from the optical disc drive 200, and a monitor (output section) 213 for displaying information.

The computer 210 incorporated with the optical disc drive 200 of the seventh embodiment as an external storage device is operable to stably record or reproduce information in or from different kinds of optical discs, and is usable for a variety of purposes. The optical disc has a large capacity, and accordingly the optical disc drive 200 is operable to record backup data of a hard disk in the computer 210. The optical disc drive 200 allows for exchange of a program or data among users, or can be carried by a user for personal use, in view of advantages that a medium (optical disc) is inexpensive and easily portable, or is compatible such that information in the medium can be read out, using other optical disc drive. The optical disc drive 200 is also operable to record or reproduce information in or from an existing medium such as DVD or CD.

Ninth Embodiment

Figure 15:
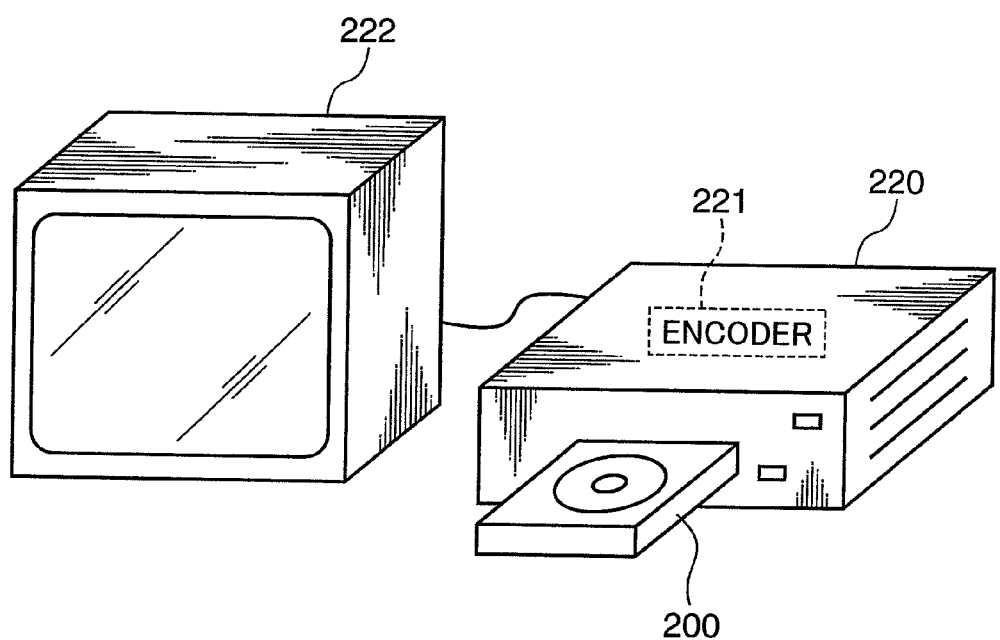
FIG. 15 is a schematic perspective view showing an entire arrangement of an optical disc recorder in accordance with a ninth embodiment of the invention.

In this section, an optical disc recorder (video recording/reproducing device) incorporated with the optical disc drive (optical information device) 200 of the seventh embodiment is described referring to FIG. 15. FIG. 15 is a schematic perspective view showing an entire arrangement of the optical disc recorder in accordance with the ninth embodiment.

Referring to FIG. 15, an optical disc recorder 220 is built in with the optical disc drive 200 of the seventh embodiment, and an encoder 221 for converting image information into information to be recorded by the optical disc drive 200. The optical disc recorder 220 is connected to a monitor 222 for displaying recorded video information in use.

The optical disc recorder 220 incorporated with the optical disc drive 200 of the seventh embodiment is operable to stably record or reproduce video information in or from different kinds of optical discs, and is usable for a variety of purposes. The optical disc recorder 220 is operable to record video information in a medium (optical disc), and reproduce the recorded video information at an intended time. Unlike a magnetic tape, a rewinding operation after a recording operation or a reproducing operation is not required for an optical disc. With use of an optical disc, it is possible to perform an operation of reproducing a lead portion of a program while recording the program, or an operation of reproducing a recorded program while recording another program. The optical disc recorder 220 allows for exchange of recorded video information among users, or can be carried by a user for personal use, in view of advantages that a medium is inexpensive and easily portable, or is compatible such that information in the medium is read out, using other optical disc recorder. The optical disc recorder 220 is also operable to record or reproduce information in or from an existing medium such as DVD or CD.

In this embodiment, described is a case that the optical disc recorder 220 is solely provided with the optical disc drive 200. Alternatively, the optical disc recorder may be built in with a hard disk drive, or have a function of recording and reproducing data on and from a video tape. In the modification, it is easy to temporarily store video information in a data source other than the optical disc, or perform a backup operation.

Tenth Embodiment

Figure 16:
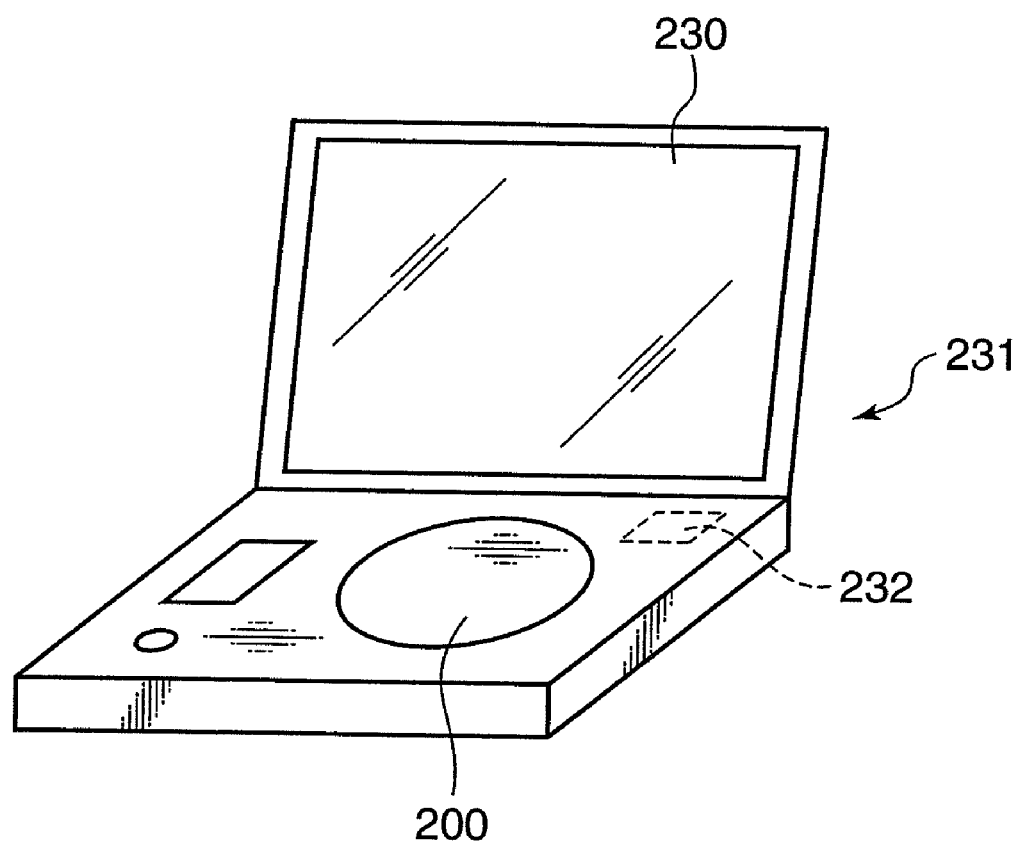
FIG. 16 is a schematic perspective view showing an entire arrangement of an optical disc player in accordance with a tenth embodiment of the invention.

In this section, an optical disc player (video reproducing device) incorporated with the optical disc drive (optical information device) 200 of the seventh embodiment is described referring to FIG. 16. FIG. 16 is a schematic perspective view showing an entire arrangement of the optical disc player in accordance with the tenth embodiment.

Referring to FIG. 16, an optical disc player 231 incorporated with a liquid crystal monitor 230 is built in with the optical disc drive 200 of the seventh embodiment, and a decoder 232 for converting an information signal to be obtained from the optical disc drive 200 into an image. The optical disc player 231 is operable to display video information recorded in an optical disc on the liquid crystal monitor 230. The optical disc player 231 incorporated with the optical disc drive 200 of the seventh embodiment is advantageous in stably reproducing video information recorded in different kinds of optical discs, and is usable for a variety of purposes.

The optical disc player 231 is operable to reproduce video information recorded in a medium (optical disc) at an intended time. Unlike a magnetic tape, a rewinding operation after a reproducing operation is not required for an optical disc. With use of an optical disc, it is possible to access an intended position where designated video information has been recorded to reproduce the video information. The optical disc player 231 is also operable to reproduce information from an existing medium such as DVD or CD.

Eleventh Embodiment

Figure 17:
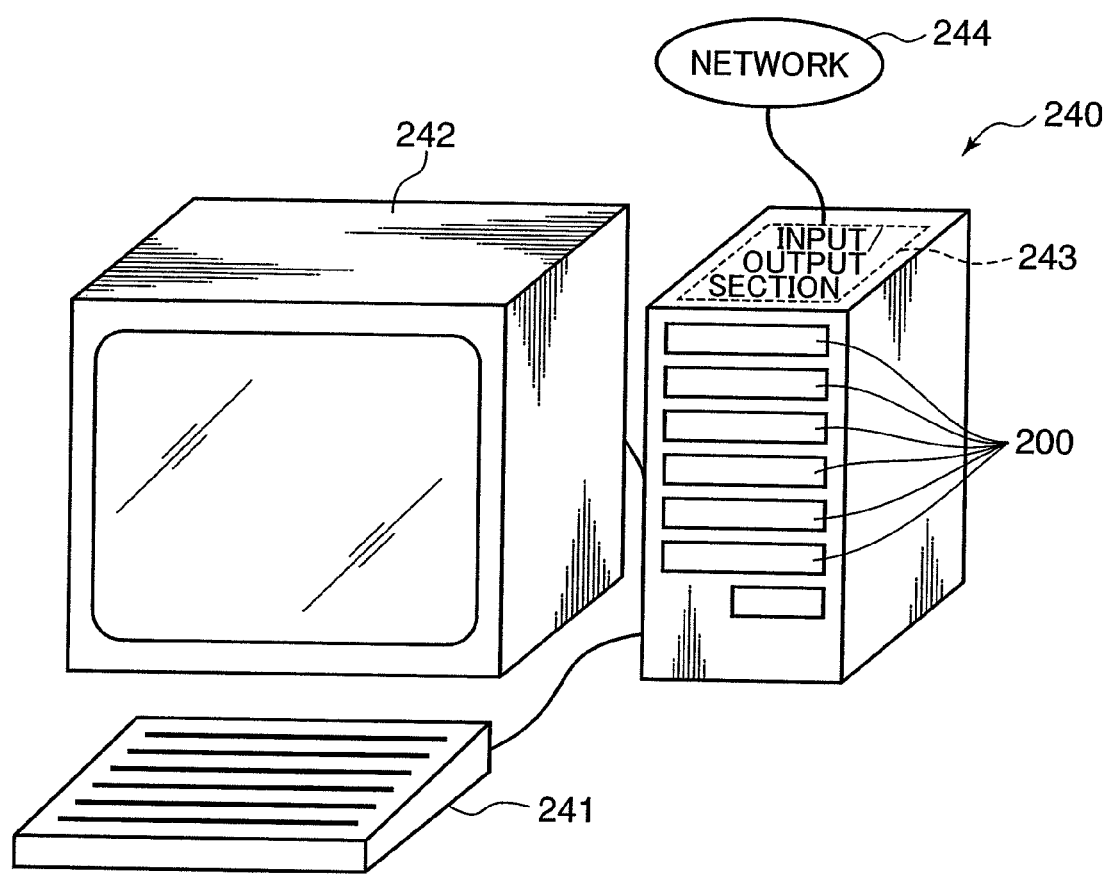
FIG. 17 is a schematic perspective view showing an entire arrangement of an optical disc server in accordance with an eleventh embodiment of the invention.

In this section, an optical disc server incorporated with the optical disc drive (optical information device) 200 of the seventh embodiment is described referring to FIG. 17. FIG. 17 is a schematic perspective view showing an entire arrangement of the optical disc server in accordance with the eleventh embodiment.

Referring to FIG. 17, an optical disc server 240 includes the optical disc drive 200 of the seventh embodiment, a keyboard 241 for allowing an operator to input information, a monitor 242 for displaying information, and an input/output section 243 for performing an input/output operation of information to be recorded or reproduced by the optical disc drive 200 with an external device. The input/output section 243 is connected to a network 244 such as the Internet.

The optical disc server 240 incorporated with the optical disc drive 200 of the seventh embodiment as an external storage device is operable to stably record or reproduce information in or from different kinds of optical discs, and is usable for a variety of purposes. The optical disc has a large capacity, and accordingly, the optical disc drive 200 is operable to transmit information (e.g. an image, a sound, a video, an HTML document, and a text document) recorded in an optical disc in response to a request from the network 244. The optical disc drive 200 is also operable to record the information transmitted from the network 244 in an intended location of an optical disc. Since the optical disc drive 200 is capable of reproducing information recorded in an existing medium such as DVD or CD, the optical disc drive 200 is capable of transmitting the information recorded in the existing medium.

Twelfth Embodiment

Figure 18:
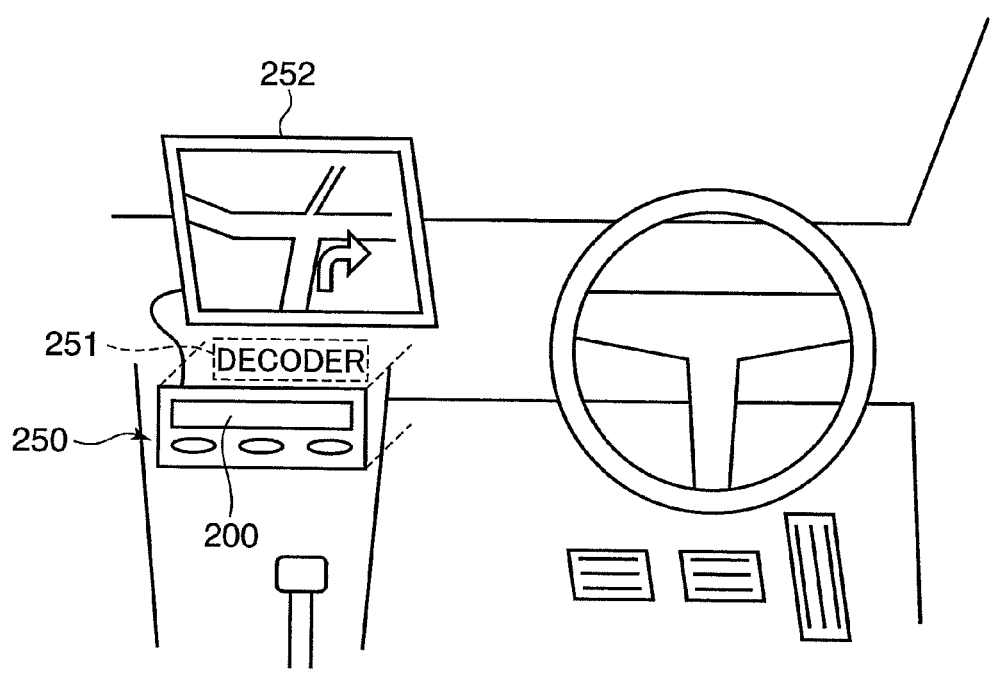
FIG. 18 is a schematic perspective view showing an entire arrangement of a car navigation system in accordance with a twelfth embodiment of the invention.
Figure 19:
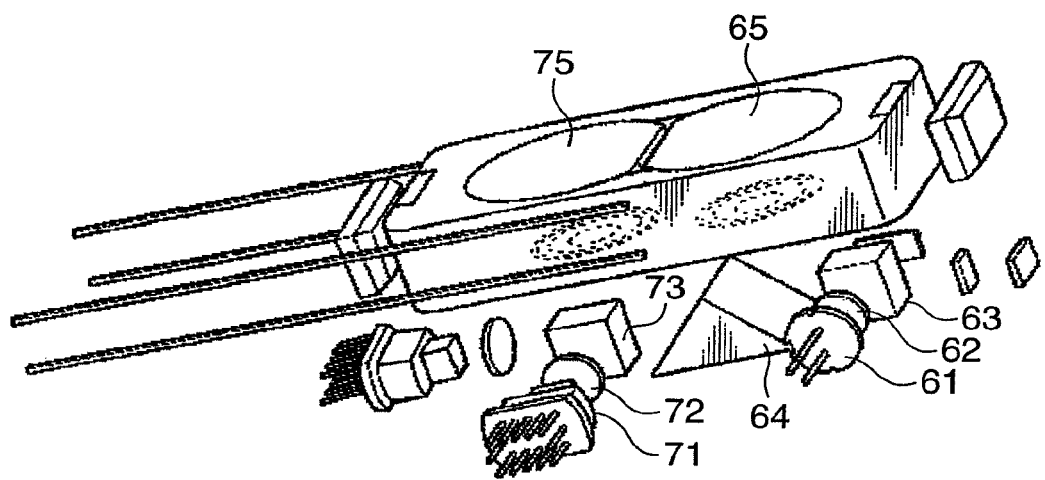
FIG. 19 is a diagram showing an arrangement of an optical pickup device of the first conventional art.
Figure 20A:
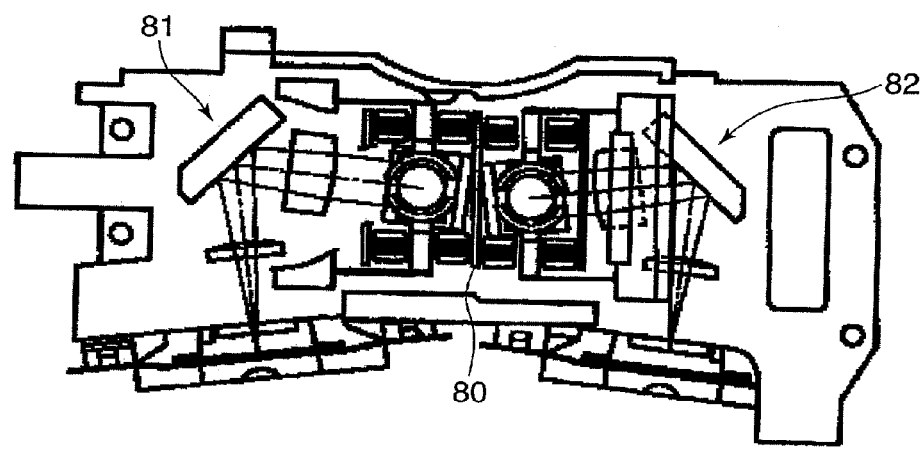
FIGS. 20A and 20B are diagrams showing an arrangement of an optical pickup device of the third conventional art.
Figure 20B:
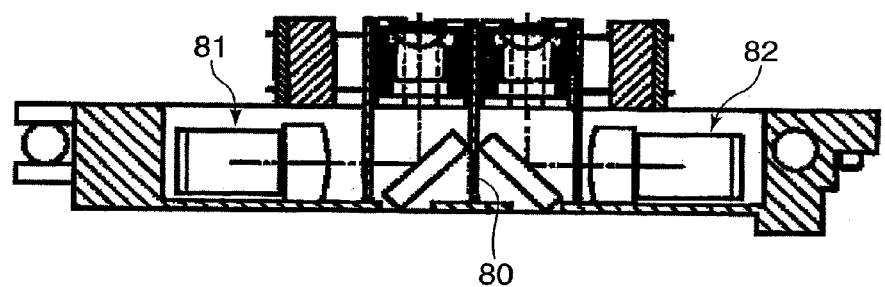
Figure 21A:
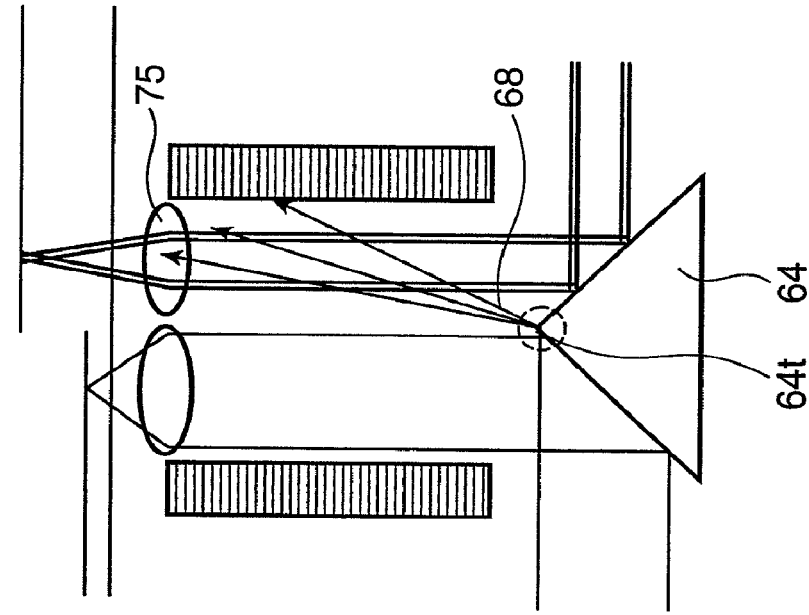
FIGS. 21A and 21B are side views of a rise-up mirror in a conventional optical pickup device.
Figure 21B:
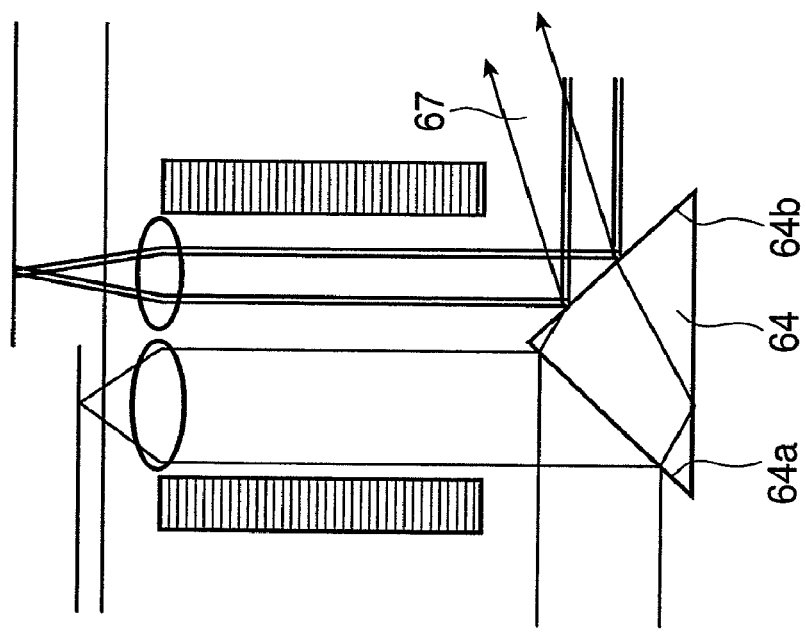

In this section, a car navigation system incorporated with the optical disc drive (optical information device) 200 of the seventh embodiment is described referring to FIG. 18. FIG. 18 is a schematic perspective view showing an entire arrangement of the car navigation system in accordance with the twelfth embodiment.

Referring to FIG. 18, a car navigation system 250 is built in with the optical disc drive 200 of the seventh embodiment, and a decoder 251 for converting an information signal to be obtained from the optical disc drive 200 into an image. The car navigation system 250 is connected to a liquid crystal monitor 252 for displaying geographical information and/or destination information in use.

The car navigation system 250 incorporated with the optical disc drive 200 of the seventh embodiment is advantageous in stably recording or reproducing video information in or from different kinds of optical discs, and accordingly is usable for a variety of purposes. The car navigation system 250 is operable to specify a current position, based on map information recorded in a medium (optical disc), and information to be provided from a Global Positioning System (GPS), a gyroscope, a speedometer, an odometer, or a like device; and display the current position on the liquid crystal monitor 252. In response to input of a destination, the car navigation system 250 is operable to search an optimum route to the destination, based on the map information or the road information, and display the optimum route on the liquid crystal monitor 252.

Use of a large-capacity optical disc capable of recording map information is advantageous in providing detailed road information covering a wide area. Service-related information such as restaurants, convenience stores, and gas stations in the vicinity of the roads can also be stored in the optical disc, and provided. The road information becomes out of date as time elapses, and may not reflect the reality. An optical disc is compatible, and is inexpensive as a medium. Accordingly, latest road information can be obtained by replacing the optical disc recorded with the out-of-date road information with an optical disc recorded with the latest road information. Further, the optical disc drive 200 is operable to record or reproduce information in or from an existing medium such as DVD or CD. Accordingly, with use of the car navigation system 250 incorporated with the optical disc drive 200, a user is allowed to watch a movie or listen to music in a car.

The above embodiments mainly embrace features of the invention having the following arrangements.

An optical pickup device according to an aspect of the invention includes: a first light source for emitting a first light beam having a first wavelength; a first optical system for guiding the first light beam to be emitted from the first light source to a first optical disc; a second light source for emitting a second light beam having a second wavelength different from the first wavelength; a second optical system for guiding the second light beam to be emitted from the second light source to a second optical disc different from the first optical disc in recording density; and a light blocking member, disposed at a position capable of blocking incidence of an unwanted light beam having the first wavelength derived from the first optical system into an optical component constituting the second optical system, for blocking the first light beam having the first wavelength.

In the above arrangement, the first light source is operable to emit the first light beam having the first wavelength, and the first optical system is operable to guide the first light beam to be emitted from the first light source to the first optical disc. The second light source is operable to emit the second light beam having the second wavelength different from the first wavelength, and the second optical system is operable to guide the second light beam to be emitted from the second light source to the second optical disc different from the first optical disc in recording density. The light blocking member, which is disposed at the position capable of blocking incidence of the unwanted light beam having the first wavelength derived from the first optical system into the optical component constituting the second optical system, is operable to block the first light beam having the first wavelength.

In the above arrangement, there is no likelihood that the first light beam having the first wavelength may be incident into the optical component constituting the second optical system. Accordingly, the above arrangement enables to prevent damage or performance degradation of the optical component constituting the second optical system, and suppress degradation of the recording/reproducing performance of the optical pickup device.

In the above arrangement, there is no need of limiting the emission light amount of the first light beam to be emitted from the first light source. Accordingly, it is possible to configure an optical pickup device capable of emitting the first light beam with a large light amount to perform a recording/reproducing operation with respect to a multi-layered optical disc, or a high-speed recording/reproducing operation.

In the optical pickup device, preferably, the first optical system may include a first rise-up mirror for bending the first light beam to be emitted from the first light source in a direction substantially perpendicular to a recording surface of the first optical disc; the second optical system may include a second rise-up mirror for bending the second light beam to be emitted from the second light source in a direction substantially perpendicular to a recording surface of the second optical disc; and an optical axis of the first light beam to be incident from the first light source into the first rise-up mirror may be aligned substantially parallel with an optical axis of the second light beam to be incident from the second light source into the second rise-up mirror.

In the above arrangement, the first rise-up mirror is operable to bend the first light beam to be emitted from the first light source in the direction substantially perpendicular to the recording surface of the first optical disc. The second rise-up mirror is operable to bend the second light beam to be emitted from the second light source in the direction substantially perpendicular to the recording surface of the second optical disc. The optical axis of the first light beam to be incident from the first light source into the first rise-up mirror is aligned substantially parallel with the optical axis of the second light beam to be incident from the second light source into the second rise-up mirror.

The above arrangement enables to arrange the optical components of the first optical system and the second optical system at such positions that the optical axis of the first light beam to be incident from the first light source into the first rise-up mirror is aligned substantially parallel with the optical axis of the second light beam to be incident from the second light source into the second rise-up mirror.

In the optical pickup device, preferably, the first light source and the second light source may be disposed at positions opposite to each other, and the first rise-up mirror and the second rise-up mirror may be disposed side by side in a direction perpendicular to a radial direction of the first optical disc and the second optical disc. This arrangement enables to prevent an unwanted light beam having the first wavelength derived from the first rise-up mirror from being incident into the second rise-up mirror.

In the optical pickup device, preferably, the light blocking member may include a filter, disposed between the first rise-up mirror and the second rise-up mirror, for blocking the first light beam having the first wavelength.

In the above arrangement, the filter disposed between the first rise-up mirror and the second rise-up mirror is operable to block the first light beam having the first wavelength. The above arrangement enables to prevent an unwanted light beam transmitted through the first rise-up mirror from being incident into the second rise-up mirror.

In the optical pickup device, preferably, the light blocking member may include a filter, disposed on a surface of the first rise-up mirror where the first light beam is bent, for blocking the first light beam having the first wavelength.

In the above arrangement, the filter, which is disposed on the surface of the first rise-up mirror where the first light beam is bent, is operable to block the first light beam having the first wavelength. The above arrangement enables to prevent an unwanted light beam from being transmitted through the first rise-up mirror toward the second rise-up mirror.

In the optical pickup device, preferably, the light blocking member may include a filter, disposed on a surface of the second rise-up mirror where the second light beam is bent, for blocking the first light beam having the first wavelength.

In the above arrangement, the filter, which is disposed on the surface of the second rise-up mirror where the second light beam is bent, is operable to block the first light beam having the first wavelength. This arrangement enables to prevent an unwanted light beam transmitted through the first rise-up mirror from being incident into the second rise-up mirror.

In the optical pickup device, preferably, the filter may have a transmittance of 5% or less with respect to the first light beam having the first wavelength.

In the above arrangement, the filter has a transmittance of 5% or less with respect to the first light beam having the first wavelength. This arrangement enables to suppress the amount of an unwanted light beam which may be incident from the first rise-up mirror to the second rise-up mirror to such a value free of damage and performance degradation of the optical components.

In the optical pickup device, preferably, the first rise-up mirror and the second rise-up mirror may be each an optical component formed of a flat plate member, and the light blocking member may include a holder for holding the first rise-up mirror and the second rise-up mirror, the holder being made of a material incapable of transmitting a light beam having the first wavelength.

In the above arrangement, the first rise-up mirror and the second rise-up mirror are each the optical component formed of the flat plate member. The first rise-up mirror and the second rise-up mirror are held on the holder made of the material incapable of transmitting the light beam having the first wavelength.

Accordingly, the holder for holding the first rise-up mirror and the second rise-up mirror enables to prevent an unwanted light beam transmitted through the first rise-up mirror from being incident into the second rise-up mirror.

In the optical pickup device, preferably, the holder may be formed on an optical base block for supporting an optical component. Since the holder is formed on the optical base block for supporting the optical component, the first rise-up mirror and the second rise-up mirror can be fixed to the optical base block, thereby enabling to perform a stable recording/reproducing operation.

In the optical pickup device, preferably, the light blocking member may be disposed on at least one surface of the first rise-up mirror, other than a surface thereof where the first light beam is bent, and may absorb the first light beam having the first wavelength, with a transmitted component or a reflected component of the first light beam being 5% or less with respect to the first light beam before absorption.

In the above arrangement, the first light beam having the first wavelength is absorbed by the light blocking member disposed on the at least one surface of the first rise-up mirror, other than the surface thereof where the first light beam is bent. The transmitted component or the reflected component of the first light beam is 5% or less with respect to the first light beam before absorption. This arrangement enables to prevent an unwanted light beam derived from the surface of the first rise-up mirror, other than the surface thereof where the first light beam is bent, from being incident into the second rise-up mirror.

In the optical pickup device, preferably, the light blocking member may be disposed on at least one surface of the first rise-up mirror, other than a surface thereof where the first light beam is bent, and may reflect the first light beam having the first wavelength with a reflectance of 5% or less.

In the above arrangement, the first light beam having the first wavelength is reflected by the light blocking member disposed on the at least one surface of the first rise-up mirror, other than the surface thereof where the first light beam is bent. The reflectance of the at least one surface of the first rise-up mirror, other than the surface thereof where the first light beam is bent, is 5% or less. This arrangement enables to prevent an unwanted light beam derived from the surface of the first rise-up mirror, other than the surface thereof where the first light beam is bent, from being incident into the second rise-up mirror.

In the optical pickup device, preferably, the first optical system may include a first objective lens for focusing the first light beam on the first optical disc, the second optical system may include a second objective lens for focusing the second light beam on the second optical disc, the optical pickup device may further include a lens holder for integrally holding the first objective lens and the second objective lens, the light blocking member may include a partition wall, formed in the lens holder, for separating an optical path of the first light beam and an optical path of the second light beam, and the partition wall may block the first light beam having the first wavelength.

In the above arrangement, the first objective lens is operable to focus the first light beam on the first optical disc, and the second objective lens is operable to focus the second light beam on the second optical disc. The lens holder integrally holds the first objective lens and the second objective lens. The partition wall is operable to separate the optical path of the first light beam and the optical path of the second light beam in the lens holder to block the first light beam having the first wavelength.

The above arrangement enables to prevent the first light beam from being incident into an optical component on the optical path of the second objective lens in the lens holder.

In the optical pickup device, preferably, the light blocking member may include a wavelength selective filter, disposed between the second objective lens and the second rise-up mirror on the optical path of the second light beam in the lens holder, for blocking the first light beam having the first wavelength and transmitting the second light beam having the second wavelength.

In the above arrangement, the wavelength selective filter disposed between the second objective lens and the second rise-up mirror on the optical path of the second light beam in the lens holder is operable to block the first light beam having the first wavelength and transmit the second light beam having the second wavelength.

The above arrangement enables to securely prevent the first light beam from being incident into an optical component on the optical path of the second objective lens.

In the optical pickup device, preferably, the first optical system may include a first rise-up mirror for bending the first light beam to be emitted from the first light source in a direction substantially perpendicular to a recording surface of the first optical disc, the second optical system may include a second rise-up mirror for bending the second light beam to be emitted from the second light source in a direction substantially perpendicular to a recording surface of the second optical disc, the first light source and the second light source may be disposed at positions opposite to each other, and the first rise-up mirror and the second rise-up mirror may be disposed side by side in a radial direction of the first optical disc and the second optical disc.

In the above arrangement, the first rise-up mirror is operable to bend the first light beam to be emitted from the first light source in the direction substantially perpendicular to the recording surface of the first optical disc. The second rise-up mirror is operable to bend the second light beam to be emitted from the second light source in the direction substantially perpendicular to the recording surface of the second optical disc. The first light source and the second light source are disposed at the positions opposite to each other, and the first rise-up mirror and the second rise-up mirror are disposed side by side in the radial direction of the first optical disc and the second optical disc.

The above arrangement enables to reduce the size of the optical pickup device, as compared with an arrangement, wherein the first rise-up mirror and the second rise-up mirror are disposed in a direction perpendicular to the radial direction of the first optical disc and the second optical disc.

In the optical pickup device, preferably, the light blocking member may include a filter intersecting with an optical axis of the first light beam, and disposed on a surface of the first rise-up mirror other than an incident surface of the first light beam, for blocking the first light beam having the first wavelength.

In the above arrangement, the filter, which intersects with the optical axis of the first light beam, and is disposed on the surface of the first rise-up mirror other than the incident surface of the first light beam, is operable to block the first light beam having the first wavelength. This arrangement enables to prevent an unwanted light beam derived from the surface of the first rise-up mirror other than the incident surface of the first light beam, from being incident into the second optical system.

In the optical pickup device, preferably, the light blocking member may include a filter, disposed between the first rise-up mirror and the second rise-up mirror, for blocking the first light beam having the first wavelength.

In the above arrangement, the filter disposed between the first rise-up mirror and the second rise-up mirror is operable to block the first light beam having the first wavelength. This arrangement enables to prevent a light beam passing an outer region of the optical component constituting the first optical system, or unwanted inner reflection stray light in and out of an optical base block from being incident into the second optical system.

In the optical pickup device, preferably, the first light beam and the second light beam may be irradiated from an identical direction, and an optical axis of the first light beam to be incident into the first rise-up mirror may be aligned with an optical axis of the second light beam to be incident into the second rise-up mirror.

In the above arrangement, the first light beam and the second light beam are irradiated from the identical direction, and the optical axis of the first light beam to be incident into the first rise-up mirror is aligned with the optical axis of the second light beam to be incident into the second rise-up mirror. This enables to reduce the size of the optical pickup device, as compared with an arrangement, wherein the first light source and the second light source are disposed at positions opposite to each other.

In the optical pickup device, preferably, the first rise-up mirror may bend the first light beam to be emitted from the first light source in a direction substantially perpendicular to a recording surface of the first optical disc, and transmit the second light beam, the second rise-up mirror may bend the second light beam transmitted through the first rise-up mirror in a direction substantially perpendicular to a recording surface of the second optical disc, and the light blocking member may include a filter, disposed between the first rise-up mirror and the second rise-up mirror, for blocking the first light beam having the first wavelength.

In the above arrangement, the filter disposed between the first rise-up mirror and the second rise-up mirror is operable to block the first light beam having the first wavelength. This enables to prevent an unwanted light beam transmitted through the first rise-up mirror with the second light beam from being incident into the second rise-up mirror.

In the optical pickup device, preferably, the first rise-up mirror may bend the first light beam to be emitted from the first light source in a direction substantially perpendicular to a recording surface of the first optical disc, and transmit the second light beam, the second rise-up mirror may bend the second light beam transmitted through the first rise-up mirror in a direction substantially perpendicular to a recording surface of the second optical disc, the second optical system may include a second objective lens for focusing the second light beam bent by the second rise-up mirror on the second optical disc, and the light blocking member may include a filter, disposed between the second rise-up mirror and the second objective lens, for blocking the first light beam having the first wavelength.

In the above arrangement, the second objective lens is operable to focus the second light beam bent by the second rise-up mirror on the second optical disc, and the filter disposed between the second rise-up mirror and the second objective lens is operable to block the first light beam having the first wavelength.

The above arrangement enables to prevent an unwanted light beam bent by the second rise-up mirror with the second light beam from being incident into the second objective lens.

In the optical pickup device, preferably, the second optical system may include at least one or more optical components made of a resin material.

An optical component made of a resin material is likely to be damaged or subjected to performance degradation, resulting from irradiation of a light beam having a short wavelength. The above arrangement enables to prevent a light beam derived from the first optical system from being incident into the second optical system. Accordingly, the second optical system can be constituted of an optical component made of a resin material, which is advantageous in reducing the production cost of the optical pickup device.

In the optical pickup device, preferably, the first wavelength may be from 390 nm to 420 nm. This arrangement enables to prevent an unwanted light beam of blue laser light having a wavelength from 390 nm to 420 nm from being incident into an optical component constituting the second optical system.

An optical information device according to another aspect of the invention includes the aforementioned optical pickup device, a motor for rotating the optical disc, and a controlling section for performing a focus control, a tracking control, an information reproducing control, and a rotation control of the motor, based on a signal to be obtained from the optical pickup device, in response to the signal.

In the above arrangement, the focus control, the tracking control, the information reproducing control, and the rotation control of the motor are performed based on the signal to be obtained from the optical pickup device. Accordingly, the optical pickup device can be applied to the optical information device.

A computer according to another aspect of the invention includes the aforementioned optical information device, an input section for allowing an operator to input information, a computing device for performing a computation, based on the information inputted from the input section and information reproduced from the optical information device, and an output section for outputting the information inputted from the input section, the information reproduced from the optical information device, and a computation result of the computing device.

In the above arrangement, the input section allows the operator to input the information, and the computing device is operable to perform the computation, based on the information inputted from the input section and the information reproduced from the optical information device. The output section is operable to output the information inputted from the input section, the information reproduced from the optical information device, and the computation result of the computing device. Accordingly, the optical information device incorporated with the optical pickup device can be applied to the computer.

An optical disc player according to another aspect of the invention includes the aforementioned optical information device, and a decoder for converting an information signal to be obtained from the optical information device into an image.

In the above arrangement, since the decoder is operable to convert the information signal to be obtained from the optical information device into the image, the optical information device incorporated with the optical pickup device can be applied to the optical disc player.

A car navigation system according to another aspect of the invention includes the aforementioned optical information device, and a decoder for converting an information signal to be obtained from the optical information device into an image.

In the above arrangement, since the decoder is operable to convert the information signal to be obtained from the optical information device into the image, the optical information device incorporated with the optical pickup device can be applied to the car navigation system.

An optical disc recorder according to another aspect of the invention includes the aforementioned optical information device, and an encoder for converting image information into information to be recoded by the optical information device.

In the above arrangement, since the encoder is operable to convert the image information into the information to be recorded by the optical information device, the optical information device incorporated with the optical pickup device can be applied to the optical disc recorder.

An optical disc server according to still another aspect of the invention includes the aforementioned optical information device, and an input/output section for performing an input/output operation of information to be recorded or reproduced by the optical information device with an external device.

In the above arrangement, the input/output section is operable to perform the input/output operation of the information to be recorded or reproduced by the optical information device with the external device. Accordingly, the optical information device incorporated with the optical pickup device can be applied to the optical disc server.

INDUSTRIAL APPLICABILITY

The optical pickup device, the optical information device, the computer, the optical disc player, the car navigation system, the optical disc recorder, and the optical disc server of the invention are operable to prevent damage and performance degradation of an optical component constituting the second optical system, and suppress degradation of the recording/reproducing performance of the optical pickup device; and are useful as an optical pickup device, an optical information device, a computer, an optical disc player, a car navigation system, an optical disc recorder, and an optical disc server for recording information in an optical disc and/or reproducing information from an optical disc. Also, the invention is widely utilized in the industrial field ranging from a computer to an audio-visual apparatus utilizing an optical disc, and therefore, the industrial applicability of the invention is advantageously wide and large.

The invention claimed is:
1. An optical pickup device comprising:
a first light source for emitting a first light beam having a first wavelength ranging between 390 nm and 420 nm;
a first optical system for guiding the first light beam emitted from the first light source to a first optical disc;
a second light source for emitting a second light beam having a second wavelength different from the first wavelength;
a second optical system for guiding the second light beam emitted from the second light source to a second optical disc different from the first optical disc in regards to recording density; and
a light blocking member (i) disposed at a position capable of blocking incident light, of an unwanted light beam having the first wavelength and derived from the first optical system, from entering into an optical component constituting at least a portion of the second optical system but not constituting any portion of the first optical system, and (ii) for blocking the first light beam having the first wavelength,
wherein the first optical system includes:
a first rise-up mirror for bending the first light beam emitted from the first light source in a direction substantially perpendicular to a recording surface of the first optical disc; and
a first objective lens for focusing the first light beam bent by the first rise-up mirror onto the first optical disc,
wherein the second optical system includes:
a second rise-up mirror for bending the second light beam emitted from the second light source in a direction substantially perpendicular to a recording surface of the second optical disc; and
a second objective lens, which is disposed at a position different from the first objective lens, for focusing the second light beam, which proceeds along an optical path different from an optical path along which the first light beam proceeds and which is bent by the second rise-up mirror, onto the second optical disc,
wherein the first light source and the second light source are disposed at opposing positions,
wherein the first rise-up mirror and the second rise-up mirror are disposed side by side in a direction perpendicular to a radial direction of the first optical disc and the second optical disc, and wherein the light blocking member includes a filter disposed on a surface of the first rise-up mirror which bends the first light beam in the direction substantially perpendicular to the recording surface of the first optical disc, the filter being disposed on at least any area of the surface of the first rise-up mirror on which the first light beam is incident so as to block the first light beam having the first wavelength.

2. The optical pickup device according to claim 1, wherein the first optical system includes a first objective lens for focusing the first light beam on the first optical disc, the second optical system includes a second objective lens for focusing the second light beam on the second optical disc, the optical pickup device further includes a lens holder for integrally holding the first objective lens and the second objective lens, the light blocking member includes a partition wall, formed in the lens holder, for separating an optical path of the first light beam and an optical path of the second light beam, and the partition wall blocks the first light beam having the first wavelength.

3. The optical pickup device according to claim 1, wherein the second optical system includes at least one or more optical components comprised of a resin material.

4. An optical information device comprising:
the optical pickup device of claim 1;
a motor for rotating the first optical disc or the second optical disc; and
a controlling section for, in response to a signal obtained from the optical pickup device, performing a focus control, a tracking control, an information reproducing control, and a rotation control of the motor, based on the signal obtained from the optical pickup device.

5. A computer comprising:
the optical information device of claim 4;
an input section for allowing an operator to input information;
a computing device for performing a computation, based on the information inputted from the input section and information reproduced from the optical information device; and
an output section for outputting the information inputted from the input section, the information reproduced from the optical information device, and a computation result of the computing device.

6. An optical disc player comprising:
the optical information device of claim 4; and
a decoder for converting an information signal obtained from the optical information device into an image.

7. A car navigation system comprising:
the optical information device of claim 4; and
a decoder for converting an information signal obtained from the optical information device into an image.

8. An optical disc recorder comprising:
the optical information device of claim 4; and
an encoder for converting image information into information to be recorded onto the optical information device.

9. An optical disc server comprising:
the optical information device of claim 4; and
an input/output section for performing an input/output operation of information to be recorded onto or reproduced from the optical information device with an external device.

10. An optical pickup device comprising:
a first light source for emitting a first light beam having a first wavelength ranging between 390 nm and 420 nm;
a first optical system for guiding the first light beam emitted from the first light source to a first optical disc;
a second light source for emitting a second light beam having a second wavelength different from the first wavelength;
a second optical system for guiding the second light beam emitted from the second light source to a second optical disc different from the first optical disc in regards to recording density; and
a light blocking member (i) disposed at a position capable of blocking incident light, of an unwanted light beam having the first wavelength and derived from the first optical system, from entering into an optical component constituting at least a portion of the second optical system but not constituting any portion of the first optical system, and (ii) for blocking the first light beam having the first wavelength, wherein the first optical system includes:
a first rise-up mirror for bending the first light beam emitted from the first light source in a direction substantially perpendicular to a recording surface of the first optical disc; and
a first objective lens for focusing the first light beam bent by the first rise-up mirror onto the first optical disc, wherein the second optical system includes:
a second rise-up mirror for bending the second light beam emitted from the second light source in a direction substantially perpendicular to a recording surface of the second optical disc; and
a second objective lens, which is disposed at a position different from the first objective lens, for focusing the second light beam, which proceeds along an optical path different from an optical path along which the first light beam proceeds and which is bent by the second rise-up mirror, onto the second optical disc, wherein the first light source and the second light source are disposed at opposing positions, wherein the first rise-up mirror and the second rise-up mirror are disposed side by side in a direction perpendicular to a radial direction of the first optical disc and the second optical disc, and wherein the light blocking member includes a filter (i) disposed on a surface of the second rise-up mirror where the second light beam is bent, and (ii) for blocking the first light beam having the first wavelength.

* * * * *